(12) United States Patent
Baugh et al.

(10) Patent No.: US 9,186,616 B2
(45) Date of Patent: *Nov. 17, 2015

(54) IONIC LIQUIDS FOR REMOVAL OF CARBON DIOXIDE

(75) Inventors: Lisa S. Baugh, Ringoes, NJ (US); Pavel Kortunov, Flemington, NJ (US); Michael Siskin, Westfield, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 975 days.

This patent is subject to a terminal disclaimer.

(21) Appl. No.: 13/228,556

(22) Filed: Sep. 9, 2011

(65) Prior Publication Data

US 2012/0063977 A1    Mar. 15, 2012

Related U.S. Application Data

(60) Provisional application No. 61/381,294, filed on Sep. 9, 2010, provisional application No. 61/381,351, filed on Sep. 9, 2010, provisional application No. 61/420,960, filed on Dec. 8, 2010, provisional (Continued)

(51) Int. Cl.
| | |
|---|---|
| *B01D 53/62* | (2006.01) |
| *B01D 53/78* | (2006.01) |
| *B01D 53/96* | (2006.01) |
| *B01D 53/14* | (2006.01) |

(52) U.S. Cl.
CPC ........ *B01D 53/1475* (2013.01); *B01D 53/1493* (2013.01); *B01D 53/62* (2013.01); *B01D 2252/2056* (2013.01); *B01D 2252/20415* (2013.01); *B01D 2252/20421* (2013.01); *B01D2252/20426* (2013.01); *B01D 2252/20431* (2013.01); *B01D 2252/20478* (2013.01); *B01D 2252/30* (2013.01); *Y02C 10/04* (2013.01); *Y02C 10/06* (2013.01)

(58) Field of Classification Search
None
See application file for complete search history.

(56) References Cited

U.S. PATENT DOCUMENTS

| | | |
|---|---|---|
| 3,347,621 A | 10/1967 | Papadopoulos et al. |
| 3,794,586 A | 2/1974 | Kimura et al. |

(Continued)

FOREIGN PATENT DOCUMENTS

| | | |
|---|---|---|
| CN | 1354036 | 6/2002 |
| CN | 101279181 | 10/2008 |

(Continued)

OTHER PUBLICATIONS

Rodima et al., "Acid-Base Equilibria in Nonpolar Media. 2. Self-Consistent Basicity Scale in THF Solution Ranging from 2-Methoxypyridine to EtP1(pyrr) Phosphazene." J. Org. Chem. 2002, 67, 1873-1881 (published on Web on Feb. 22, 2002).*

(Continued)

*Primary Examiner* — Stuart Hendrickson
*Assistant Examiner* — Daniel Berns
(74) *Attorney, Agent, or Firm* — David M. Weisberg; Andrew T. Ward

(57) ABSTRACT

Ionic liquids containing a cation with a potentially nucleophilic carbon atom bearing a relatively acidic hydrogen atom bonded to a potentially nucleophilic carbon atom, typically in the conjugated —NC(H)N— structure or a —NC(H)S— structure of imidazolium, imidazolidinium or thiazolium salts, can be capable of acting as sorbents for $CO_2$ in cyclic separation processes. The ionic liquid may be used on its own, mixed with a solvent, preferably an aprotic, polar, non-aqueous solvent such as toluene, DMSO, NMP or sulfolane, or in conjunction with a non-nucleophilic nitrogenous base promoter compound having a $pK_a$ of at least 10.0 such as a carboxamidine or a guanidine.

36 Claims, 8 Drawing Sheets

Related U.S. Application Data application No. 61/420,978, filed on Dec. 8, 2010, provisional application No. 61/421,048, filed on Dec. 8, 2010, provisional application No. 61/381,281, filed on Sep. 9, 2010.

(56) References Cited

U.S. PATENT DOCUMENTS

| | | | |
|---|---|---|---|
| 4,100,257 | A | 7/1978 | Sartori et al. |
| 4,112,051 | A | 9/1978 | Sartori et al. |
| 4,410,335 | A | 10/1983 | Childs |
| 4,474,682 | A | 10/1984 | Billenstein et al. |
| 4,539,189 | A | 9/1985 | Starkston et al. |
| 4,624,838 | A | 11/1986 | Pan et al. |
| 4,636,323 | A | 1/1987 | Nagai et al. |
| 5,057,122 | A | 10/1991 | Blain et al. |
| 5,068,046 | A | 11/1991 | Blain et al. |
| 5,565,145 | A | 10/1996 | Watson et al. |
| 5,879,433 | A | 3/1999 | Gallup et al. |
| 6,075,000 | A | 6/2000 | Rohrbaugh et al. |
| 6,140,276 | A | 10/2000 | Duncum et al. |
| 6,579,343 | B2 | 6/2003 | Brennecke et al. |
| 6,586,106 | B2 | 7/2003 | Shibuya et al. |
| 7,527,775 | B2 * | 5/2009 | Chinn et al. ............ 423/226 |
| 2002/0189444 | A1 | 12/2002 | Brennecke et al. |
| 2004/0035293 | A1 | 2/2004 | Davis, Jr. |
| 2005/0129598 | A1 | 6/2005 | Chinn et al. |
| 2005/0183337 | A1 | 8/2005 | Cadours et al. |
| 2005/0239974 | A1 | 10/2005 | Grimm et al. |
| 2005/0257421 | A1 | 11/2005 | Siggelkow et al. |
| 2006/0188423 | A1 | 8/2006 | Cadours et al. |
| 2006/0251558 | A1 | 11/2006 | Chinn et al. |
| 2007/0286783 | A1 | 12/2007 | Carrette et al. |
| 2008/0004362 | A1 | 1/2008 | Masuda et al. |
| 2008/0025893 | A1 | 1/2008 | Asprion et al. |
| 2008/0050296 | A1 | 2/2008 | Tontiwachwuthikul et al. |
| 2008/0141858 | A1 | 6/2008 | Liu et al. |
| 2008/0187485 | A1 | 8/2008 | Magne-Drisch et al. |
| 2009/0136402 | A1 | 5/2009 | Heldebrant et al. |
| 2009/0263302 | A1 | 10/2009 | Hu |
| 2009/0291874 | A1 | 11/2009 | Bara et al. |
| 2010/0288126 | A1 | 11/2010 | Agar et al. |
| 2011/0293498 | A1 | 12/2011 | Lahary et al. |
| 2013/0164200 | A1 * | 6/2013 | Lail et al. ............ 423/210 |

FOREIGN PATENT DOCUMENTS

| | | |
|---|---|---|
| DE | 3504538 | 9/1985 |
| DE | 102008007087 A1 | 8/2009 |
| DE | 102008013738 A1 | 9/2009 |
| EP | 0 349 787 B1 | 8/1994 |
| EP | 0692558 | 1/1996 |
| FR | 2918386 A1 | 7/2007 |
| GB | 1 473 103 A | 5/1977 |
| JP | 56145984 | 11/1981 |
| JP | 61225293 | 10/1986 |
| JP | 2003193385 | 7/2003 |
| JP | 2005126279 | 5/2005 |
| JP | 2006150298 | 6/2006 |
| JP | 2007197503 | 8/2007 |
| WO | 2006103812 A1 | 10/2006 |
| WO | 2007/003618 A1 | 1/2007 |
| WO | 2008/007320 A3 | 1/2008 |
| WO | 2008/015217 A1 | 2/2008 |
| WO | 2008068411 A2 | 6/2008 |
| WO | 2008/094846 A1 | 8/2008 |
| WO | 2010089257 A1 | 8/2010 |

OTHER PUBLICATIONS

S. Dinda et al., "Kinetics of reactive absorption of carbon dioxide with solutions of aniline in carbon tetrachloride and chloroform", Chemical Engineering Journal, 136 (2008), 349-357.

M. Smiglak et al., "Ionic liquids via reaction of the zwitterionic 1,3-dimethylimidazolium-2-carboxylate with protic acids. Overcoming synthetic limitations and establishing new halide free protocols for the formation of ILs", Green Chemistry, 9 (2007), 90-98.

A.M. Voutchkova et al., "Imidazolium Carboxylates as Versatile and Selective N-Heterocyclic Carbene Transfer Agents: Synthesis, Mechanism, and Applications", J. Amer. Chem. Soc., 129 (2007), 12834-46.

I. Tommasi & F. Sorrentino, "Synthesis of 1,3-dialkylimidazolium-2-carboxylates by direct carboxylation of 1,3- dialkylimidazolium chlorides with CO2", Tetrahedron Letters, 47 (2006), 6453-6.

H.A. Duong et al., "Reversible carboxylation of N-heterocyclic carbenes", Chem. Commun., 2004, 112-3.

A. Tudose et al., "Imidazol(in)ium-2-carboxylates as N-heterocyclic carbene precursors in ruthenium-arene catalysts for olefin metathesis and cyclopropanation", J. Organomet. Chem., 691 (2006), 5356-65.

N. J. Bridges et al., "An Intermediate for the Clean Synthesis of Ionic Liquids: Isolation and Crystal Structure of 1,3-Dimethylimidazolium Hydrogen Carbonate Monohydrate", Chem. Eur., 13 (2007), 5207-12.

H. Zhou et al., "CO2 Adducts of N-Heterocyclic Carbenes: Thermal Stability and Catalytic Activity toward the Coupling of CO2 with Epoxides", J. Org. Chem., 73 (2008), 8039-44.

E. Sada et al., "Reaction Kinetics of Carbon Dioxide with Amines in Non-aqueous Solvents", Chemical Engineering Journal, 33 (1986), 87-95.

P.J. Carvalho et al., "Specific Solvation Interactions of CO2 on Acetate and Trifluoroacetate Imidazolium Based Ionic Liquids at High Pressures", J. Phys. Chem. B, 113 (2009), 6803-12.

C. Cadena et al., "Why is CO2 So Soluble in Imidazolium-Based Ionic Liquids?", J. Am. Chem. Soc., 126 (2004), 5300-8.

A. Yokozeki et al., "Physical and Chemical Absorptions of Carbon Dioxide in Room-Temperature Ionic Liquids", J. Phys. Chem. B, 112 (2008), 16654-63.

M.B. Shiflett et al., "Phase behavior of (carbon dioxide + [bmim][Ac]) mixtures", J. Chem. Thermo. 40 (2008), 25-31.

E.J. Maginn, "Design and Evaluation of Ionic Liquids as Novel CO2 Absorbents", University of Notre Dame Quarterly Technical Report, May 31, 2005, DOE Award Number: DE-FG26-04NT42122.

Z.J. Dijkstra et al., "Formation of carbamic acid in organic solvents and in supercritical carbon dioxide", J. Supercritical Fluids, 41 (2007), 109-114.

K. Masuda et al., "Studies on the solvent dependence of the carbamic acid formation from omega-(1-naphthyl) alkylamines and carbon dioxide", Tetrahedron, 61 (2005), 213-229.

E.M. Hampe & D.M. Rudkevich, "Reversible covalent chemistry of CO2", Chem. Commun. (2002), 1450-51.

P.G. Jessop et al., "Reversible nonpolar-to-polar solvent", Nature, v. 436, Aug. 25, 2005, p. 1102.

D.J. Heldebrant et al., "Organic liquid CO2 capture agents with high gravimetric CO2 capacity", Energy & Environmental Science, 1 (2008), 487-93.

L. Phan et al., "Switchable Solvents Consisting of Amidine/Alcohol or Guanidine/Alcohol Mixtures", Ind. Eng. Chem. Res., 47 (2008), 539-45.

E.M. Hampe & D.M. Rudkevich, "Exploring reversible reactions between CO2 and amines", Tetrahedron, 59 (2003), 9619-25.

Y. Kayaki et al., "Utilization of N,N-Dialkylcarbamic Acid Derived from Secondary Amines and Supercritical Carbon Dioxide: Stereoselective Synthesis of Z Alkenyl Carbamates with a CO2-Soluble Ruthenium-P(OC2H5)3 Catalyst", Chem. Asian J., 3 (2008), 1865-70.

E. Sada et al., "Chemical Kinetics of the Reaction of Carbon Dioxide with Ethanolamines in Nonaqueous Solvents", AIChE Journal, 31(8), Aug 1985, 1297-1303.

D.J. Heldebrant et al., "CO2-binding organic liquids (CO2BOLs) for post-combustion CO2 capture", Energy Procedia, 1 (2009), 1187-95.

G.F. Versteeg et al., "On the Kinetics Between CO2 and Alkanolamines both in Aqueous and Non-Aqueous Solutions. An Overview", Chem. Eng. Comm., 144 (1996), 113-58.

(56) References Cited

OTHER PUBLICATIONS

G.F. Versteeg & W.P.M. Van Swaaij, "On the Kinetics Between CO2 and Alkanolamines Both in Aqueous and Non-Aqueous Solutions—I. Primary and Secondary Amines", Chemical Engineering Science, 43(3), 1988, 573-85.
R.A. Davis & O.C. Sandall, "Kinetics of the Reaction of Carbon Dioxide With Secondary Amines in Polyethylene Glycol", Chemical Engineering Science, 48(18), 1993, 3187-93.
J.E. Bara et al., "Gas Processing With Ionic Liquid-Amine Solvents", URS Corporation (Denver, Colorado), 2010.
M. Kim & J.-W. Park, "Reversible, solid state capture of carbon dioxide by hydroxylated amidines", Chem. Commun., 46 (2010), 2507-9.
E.J. Maginn et al., "Development of new post-combustion carbon dioxide capture solvents: Are ionic liquids the answer?", 235th ACS National Meeting, Apr. 6-10, 2008, Abstract.
S. Dinda et al., "Kinetics of Reactive Absorption of Carbon Dioxide and Solutions of Aniline in Nonaqueous Aprotic Solvents", Ind. Eng. Chem. Res., 45 (2006), 6632-9.
D. Camper et al., "Room-Temperature Ionic Liquid-Amine Solutions: Tunable Solvents for Efficient and Reversible Capture of CO2", Ind. Eng. Chem. Res., 47 (2008), 8496-8.
J.E. Bara et al., "Guide to CO2 Separations in Imidazolium-Based Room-Temperature Ionic Liquids", Ind. Eng. Chem. Res., 48 (2009), 2739-51.
J.A. Tossell, "Catching CO2 in a Bowl", Inorganic Chemistry, 48 (2009), 7105-10.
H. Zhou et al., "N-Heterocyclic Carbene Functionalized Polymer for Reversible Fixation—Release of CO2", Macromolecules, 42 (2009), 5419-21.
Y. Ito, "Formation of Carbamic Acids and Their Photochemistry", Kokagaku Kyokai, 33(3), 2002, 205-12. English Abstract only.
N. Imaishi et al., "Chemical absorption of carbon dioxide by non-aqueous solutions of cyclohexylamine", Kagaku Kogaku Robunshu, 7(3), 1981, 261-6. English Abstract only.
D. Wan et al., "Can Nonspecific Host-Guest Interaction lead to Highly Specific Encapsulation by a Supramolecular Nanocapsule?", Macromolecules, 42 (2009), 6448-56.
V.L. Yushko et al., "Effect of water content on the solubility of carbon dioxide in solutions of monoethanolamine in sulfolane", Voprosy Khimii i Khimicheskoi Tekhnologii, 30 (1973), 3-5. English Abstract only.
E. Sada et al., "Chemical Absorption of Carbon Dioxide into Ethanolamine Solutions of Polar Solvent", AIChE Journal, 32(2), Feb. 1986, 347-9.
K. Yogish "Absorption of CO2 in Some Hybrid Solvents", Can. J. Chem. Eng., 68 (1990), 511-2.
P.S. Kumar et al., "New absorption liquids for the removal of CO2 from dilute gas streams using membrane contactors", Chem. Eng. Sci., 57 (2002), 1639-51.
K. Takeshita & A. Kitamoto, "Relation between separation factor of carbon isotope and chemical reaction of carbon dioxide with amine in nonaqueous solvent", J. Chem. Eng. Japan, 22(5), 1989, 447-54. English Abstract only.

K. Takeshita & A. Kitamoto, "Chemical equilibria of absorption of carbon dioxide into nonaqueous solution of amine", J. Chem. Eng. Japan, 21(4), 1988, 411-7. English Abstract only.
G.F. Versteeg & W.P.M. Van Swaaij, "On the Kinetics Between CO2 and Alkanolamines Both in Aqueous and Non-Aqueous Solutions—II. Tertiary Amines", Chemical Engineering Science, 43(3), 1988, 587-91.
O.R. Rivas, "Solvent selectivity for the purification of natural gases", Ph.D. Thesis, U.C. Berkeley, 1978, Abstract.
S. Xu et al., "Kinetics of the Reaction of Carbon Dioxide with 2-Amino-2-methyl-1-propanol Solutions", Chem. Eng. Sci., 51(6), 1996, 841-50.
R.J. Littell et al., "Physical absorption into non-aqueous solutions in a stirred cell reactor", Chem. Eng. Sci., 46(12), 1991, 3308-13.
I.L. Leites et al., "Removal of carbon dioxide from gas by solutions of monoethanolamine in various diluents", Khimicheskaya Promyshlennost, 8 (1975), 599-602. English Abstract only.
K. Takeshita et al., "Separation of carbon isotopes by using the chemical reaction of carbon dioxide with amines in nonaqueous solution", Kagaku Kogaku, 55(6), 1991, 426-8. English Abstract only.
Y. Liang et al., "Unimolecular Micelle Derived from hyperbranched Polyethyleneimine with Well-Defined Hybrid Shell of Poly(ethylene oxide) and Polystyrene: A Versatile Nanocapsule", J. Polym. Sci., Pt. A: Polym. Chem., 48 (2010), 681-91.
E.D. Bates et al., "CO2 Capture by a Task-Specific Ionic Liquid", J. Am. Chem. Soc., 124(6), 2002, 926ff.
J.D. Holbrey et al., "1,3-Dimethylimidazolium-2-carboxylate: the unexpected synthesis of an ionic liquid precursor and carbene-CO2 adduct", Chem. Commun., 2003, 28-29.
F. Karadas et al., "Review on the Use of Ionic Liquids (ILs) as Alternative Fluids for CO2 Capture and Natural Gas Sweetening", Energy Fuels, 24 (2010), 5817-28.
W.D. McGhee et al., "Palladium-Catalyzed Generation of O-Allylic Urethanes and Carbonates from Amines/Alcohols, Carbon Dioxide, and Allylic Chlorides", Organometallics, 12 (1993), 1429-33.
T. Yamada et al., "Reversible, Room-Temperature Ionic Liquids. Amidinium Carbamates Dervied from Amidines and Aliphatic Primary Amines with Carbon Dioxide", Chem. Mater., 19 (2007), 967-9.
T. Yamada et al., "Reversible, Room-Temperature Chiral Ionic Liquids. Amidinium Carbamates Dervied from Amidines and Amino-Acid Esters with Carbon Dioxide", Chem. Mater., 19 (2007), 4761-8.
T. Yu et al., "Carbon Dioxide and Molecular Nitrogen as Switches between Ionic and Uncharged Room-Temperature Liquids Comprised of Amidines and Chiral Amino Alcohols", Chem Mater., 20 (2008), 5337-44.
E.R. Perez et al., "Activation of Carbon Dioxide by Bicyclic Amidines", J. Org. Chem., 69 (2004), 8005-11.
A.R. Katritzky et al., "The N-Carboxylic Acids of Nitrogen Heterocycles", Heterocycles, 26 (1987), 1333-44.

* cited by examiner $^1$H and $^{13}$C NMR spectra of 1-ethyl-3-methylimidazolium acetate/TMG mixture before (top) and after (bottom) chemical reaction with $CO_2$ (Example 1.1).

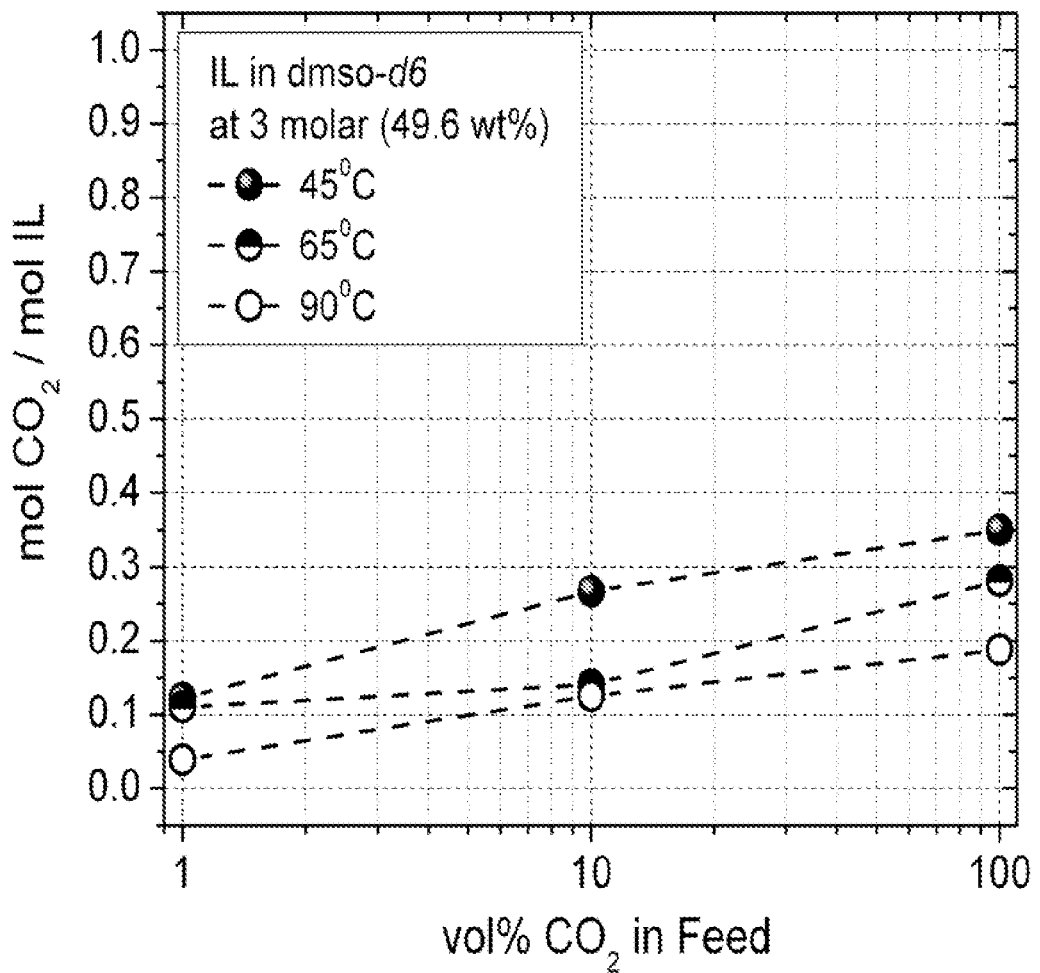
Figure 6. Vapor-Liquid Equilibrium of 1-butyl-3-methylimidazolium acetate/ $CO_2$ (Example 2.1).

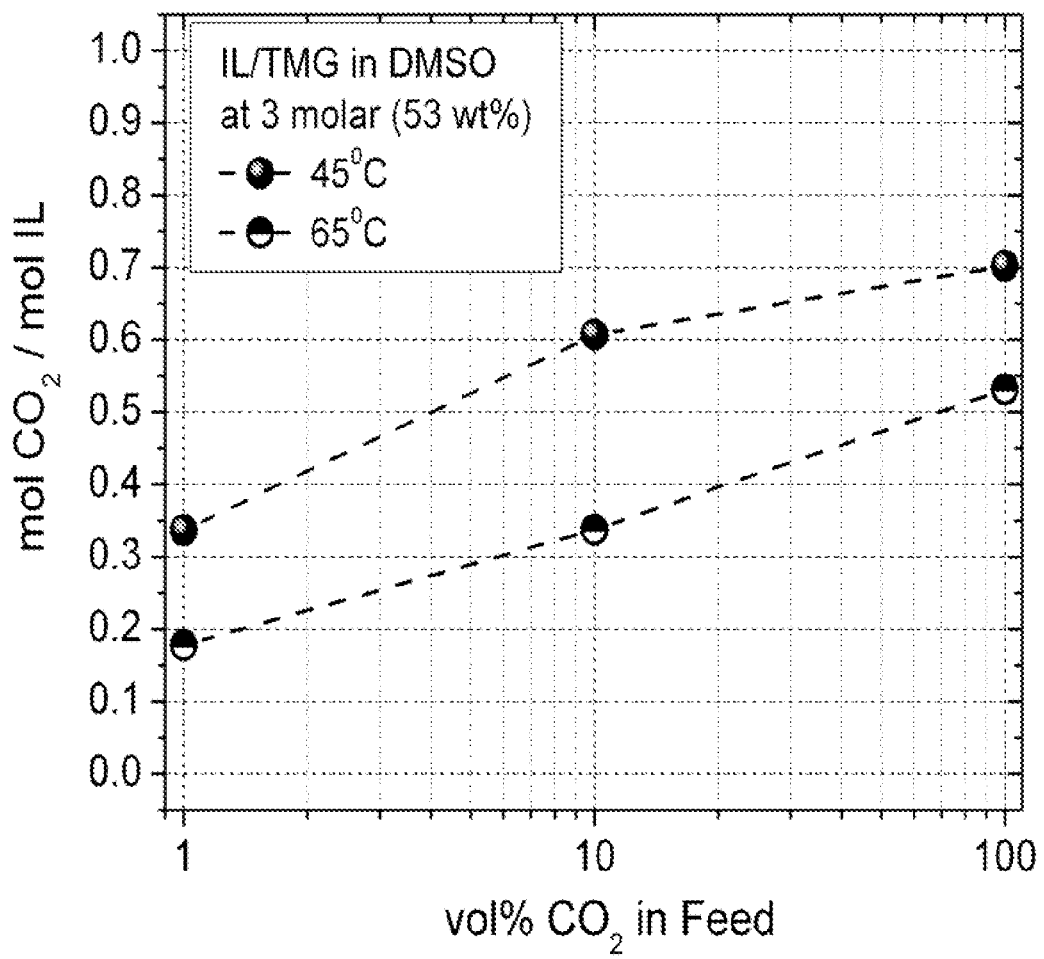
Figure 7. Vapor-Liquid Equilibrium of 1-butyl-3-methylimidazolium acetate/TMG/$CO_2$ (Example 2.2).

IONIC LIQUIDS FOR REMOVAL OF CARBON DIOXIDE

CROSS REFERENCE TO RELATED APPLICATIONS

This application claims the benefit of U.S. Provisional Application Nos. 61/381,281 filed Sep. 9, 2010, 61/381,294 filed Sep. 9, 2010, 61/381,351 filed Sep. 9, 2010, 61/420,960 filed Dec. 8, 2010, 61/420,978 filed Dec. 8, 2010, and 61/421,048 filed Dec. 8, 2010, the entire contents of each of which are hereby incorporated by reference herein.

FIELD OF THE INVENTION

This invention relates to the removal of carbon dioxide and other acid gases from a gaseous stream containing one or more of these gases. In particular, the invention relates to a method for separating an acid gas, e.g., carbon dioxide, from a gas mixture using ionic liquids as the sorbent.

BACKGROUND OF THE INVENTION

The removal of carbon dioxide from mixed gas streams is of great industrial importance and commercial value. Carbon dioxide is a ubiquitous and inescapable by-product of the combustion of hydrocarbons, and there is growing concern over its accumulation in the atmosphere and its potential role in a perceived global climate change. Laws and regulations driven by environmental factors may therefore soon be expected to require its capture and sequestration. While existing methods of $CO_2$ capture have been adequately satisfactory for the scale in which they have so far been used, future uses on the far larger scale required for significant reductions in atmospheric $CO_2$ emissions from major stationary combustion sources such as power stations fired by fossil fuels makes it necessary to improve the processes used for the removal of $CO_2$ from gas mixtures. According to data developed by the Intergovernmental Panel on Climate Change, power generation produces approximately 78% of world emissions of $CO_2$ with other industries such as cement production (7%), refineries (6%), iron and steel manufacture (5%), petrochemicals (3%), oil and gas processing (0.4%) and the biomass industry (bioethanol and bioenergy) (1%) making up the bulk of the total, illustrating the very large differences in scale between power generation on the one hand and all other uses on the other. To this must be added the individual problem of the sheer volumes of gas which will need to be treated: flue gases consist mainly of nitrogen from combustion air, with the $CO_2$, nitrogen oxides and other emissions such as sulfur oxides making up relatively smaller proportions of the gases which require treatment: typically, the flue gases from fossil fuel power stations typically contain from about 7 to 15 volume percent of $CO_2$, depending on the fuel, with natural gas giving the lowest amounts and hard coals the greatest.

Cyclic $CO_2$ absorption technologies such as Pressure Swing Absorption (PSA) and Temperature Swing Absorption (TSA) using liquid absorbents are well-established. The absorbents mostly used include liquid solvents, as in amine scrubbing processes, although solid sorbents are also used in PSA and TSA processes. Liquid amine absorbents, including alkanolamines, dissolved in water are probably the most common absorbents. Amine scrubbing is based on the chemical reaction of $CO_2$ with amines to generate carbonate/bicarbonate and carbamate salts: the aqueous amine solutions chemically trap the $CO_2$ via formation of one or more ammonium salts (carbamate/bicarbonate/carbonate) which are thermally unstable, enabling the regeneration of the free amine at moderately elevated temperatures. Commercially, amine scrubbing typically involves contacting the $CO_2$ and/or $H_2S$ containing gas stream with an aqueous solution of one or more simple amines (e.g., monoethanolamine (MEA), diethanolamine (DEA), methyldiethanolamine (MDEA) or triethanolamine (TEA)). The low molecular weight of MEA makes it economically attractive because sorption takes place on a molecular basis while the amine is sold on a weight basis. The cyclic sorption process requires high rates of gas-liquid exchange, the transfer of large liquid inventories between the absorption and regeneration steps, and high energy requirements for the regeneration of amine solutions. It is challenged by the corrosive nature of the amine solutions containing the sorbed $CO_2$. Without further improvement, these difficulties would limit the economic viability of the aqueous amine scrubbing processes in very large scale applications.

The cyclic absorption processes using aqueous sorbents require a large temperature differential in the gas stream between the absorption and desorption (regeneration) parts of the cycle. In conventional aqueous amine scrubbing methods relatively low temperatures, e.g., less than 50° C., are required for $CO_2$ uptake with an increase to a temperature to above about 100° C., e.g., 120° C., required for the desorption. The heat required to maintain the thermal differential is a major factor in the cost of the process, and with the need to regenerate the solution at temperatures above 100° C., the high latent heat of vaporization of the water (2260 kJ/Kg at 100° C.) obviously makes a significant contribution to the total energy consumption. If $CO_2$ capture is to be conducted on the larger scale appropriate to use in power stations, more effective and economical separation techniques need to be developed.

Another area where more efficient $CO_2$ separation processes are used is in enhanced oil recovery (EOR) where $CO_2$ is re-injected into the gas or liquid hydrocarbon deposits to maintain reservoir pressure. With the advanced age of many producing reservoirs worldwide and the ever-increasing challenge of meeting demand, the expanding use of EOR methods is becoming more widespread. Typically the source of carbon dioxide for EOR is the producing hydrocarbon stream itself, which may contain anywhere from less than 5% to more than 80% of $CO_2$. Other options are to capture $CO_2$ from the flue gases of various combustion sources and pre-combustion capture of $CO_2$ from shifted syngas produced in fuel gasification processes.

Various commercial $CO_2$ capture processes have been brought to market. The Fluor Daniel Econamine™ Process (originally developed by Dow Chemical and Union Carbide), which uses MEA for recovery of $CO_2$ from flue gases, primarily for EOR applications, has a number of operational plants. The Benfield™ Process using hot potassium carbonate is used in many ammonia, hydrogen, ethylene oxide and natural gas plants with over 675 units worldwide licensed by UOP and has been proposed for treating flue gas, notwithstanding its minimum $CO_2$ partial pressure requirement of 210–345 kPag (30-50 psig). One significant disadvantage of the Benfield Process is its use of a high temperature stripping step (175° C.) approximately 75-100° C. above the temperature of the absorption step. The Catacarb™ process, also using hot potassium carbonate, also uses high temperature stripping resulting in high energy consumption.

Processes using sterically hindered amines as alternatives to MEA, DEA, and TEA have also achieved success, including the ExxonMobil Flexsorb™ Process and the KS™ Process from Mitsubishi Heavy Industries and Kansai Electric Power Co.

Processes using solid absorbents are also known and while they may avoid many of the limitations of amine scrubbing, they suffer from a lack of absorbents having sufficiently selective $CO_2$ absorption under the conditions present in most commercial combustion flue gas processes.

SUMMARY OF THE INVENTION

We have now found that certain ionic liquids can be capable of acting as chemisorbents for $CO_2$ in cyclic $CO_2$ separation processes in which the $CO_2$ is desorbed from the ionic liquid and then recycled to the sorption step. Specific ionic liquids have been found to be effective at low pressures by a process of chemisorption in the liquid thus facilitating exceptionally high overall system $CO_2$ uptake efficiency. These processes are particularly useful and efficient in the presence of a non-nucleophilic nitrogenous base promoter. The carboxylation reaction between the ionic liquid and the $CO_2$ can be effective at relatively low pressures and so enables the present chemisorptive process to be effective at relatively lower pressures than the convention physisorptive process using ionic liquid sorbents.

According to the present invention, a cyclic process for separating $CO_2$ from a gas stream is provided, which process comprises contacting the gas stream with an absorbent comprising an ionic liquid containing a cation with a potentially nucleophilic carbon atom bearing a relatively acidic hydrogen atom and treating the absorbent containing the sorbed $CO_2$ under conditions sufficient to cause desorption of at least a portion of the $CO_2$ to regenerate the ionic liquid. The chemisorptive effect of the ionic liquid may be promoted by the addition of a non-nucleophilic nitrogenous base promoter to the absorbent.

The cyclic sorption-desorption process can normally be operated in a continuous cycle which comprises: a) contacting the gas stream in a gas/liquid sorption zone with a circulating stream of a non-aqueous liquid sorbent medium comprising an ionic liquid containing a cation with a potentially nucleophilic carbon atom bearing a relatively acidic hydrogen atom, under conditions to form a rich solution of $CO_2$ sorbed in the liquid sorbent medium, optionally in the presence of a non-nucleophilic nitrogenous base promoter; b) passing the rich solution of $CO_2$ sorbed in the liquid sorbent medium to a regeneration zone in which $CO_2$ is desorbed from the rich solution in the liquid sorbent medium under conditions required for desorption of the $CO_2$; and c) cycling the resulting regenerated lean solution with reduced $CO_2$ content to the sorption zone.

The sorption may be carried out at low temperatures, e.g., ambient to about 45° C., but, if the entering gas stream is at a higher temperature, as with flue gas, the sorption may be carried out at temperatures up to about 90 or 100° C. while desorption can typically be carried out at temperatures no higher than 120° C. and desirably lower, e.g., no higher than 90° C. with low temperature sorption. High temperature sorption is not precluded since, with gas streams such as natural gas with a high $CO_2$ partial pressure, absorption at high temperature can be quite feasible. The use of high temperatures such as those required in the potassium carbonate absorption processes of the prior art is not, however, required by the present process, and no use of solid sorbents mixed with the liquids is contemplated (i.e., the sorption/desorption cycles of the present invention are carried out in the absence of solid sorbents).

BRIEF DESCRIPTION OF THE DRAWINGS

FIG. 6 shows a vapor-liquid equilibrium graph for 1-butyl-3-methylimidazolium acetate/$CO_2$ for Example 2.1.

FIG. 7 shows a vapor-liquid equilibrium graph for 1-butyl-3-methylimidazolium acetate/TMG/$CO_2$ for Example 2.2.

DETAILED DESCRIPTION OF THE EMBODIMENTS

The methods of this disclosure involve removing $CO_2$ and/or other acid gases, such as $H_2S$, from a gas stream containing one or more of these gases using an ionic liquid, optionally in the presence of a non-nucleophilic nitrogenous base promoter, as a sorbent. The gas stream, typically a flue gas from the combustion of a carbonaceous fossil fuel such as natural gas, oil, and/or coal, can be brought into contact with an absorbent solution of an ionic liquid, optionally combined with a non-nucleophilic nitrogenous base promoter, under conditions in the sorption zone or tower to effect the removal of the absorbed component ($CO_2$) and thus to produce an effluent gas stream having a reduced concentration relative to the entering gas mixture. Other acid gases which may be present in the gas stream may also be absorbed under the same conditions and thus effectively removed from the gas stream. Subsequently, the absorbed component can be desorbed by adjustment of the conditions, for example, by increase in temperature, decrease in pressure, and/or by reduction of partial pressure of the desorbed component by stripping, typically with an inert (non-reactive) gas and/or a natural gas stream in a regeneration tower. Under the selected desorption conditions, the sorbed component can be purged from the selective absorbent and can then be sent for further processing, utilization, and/or sequestration.

Cyclic Sorption Unit

Figure 1:
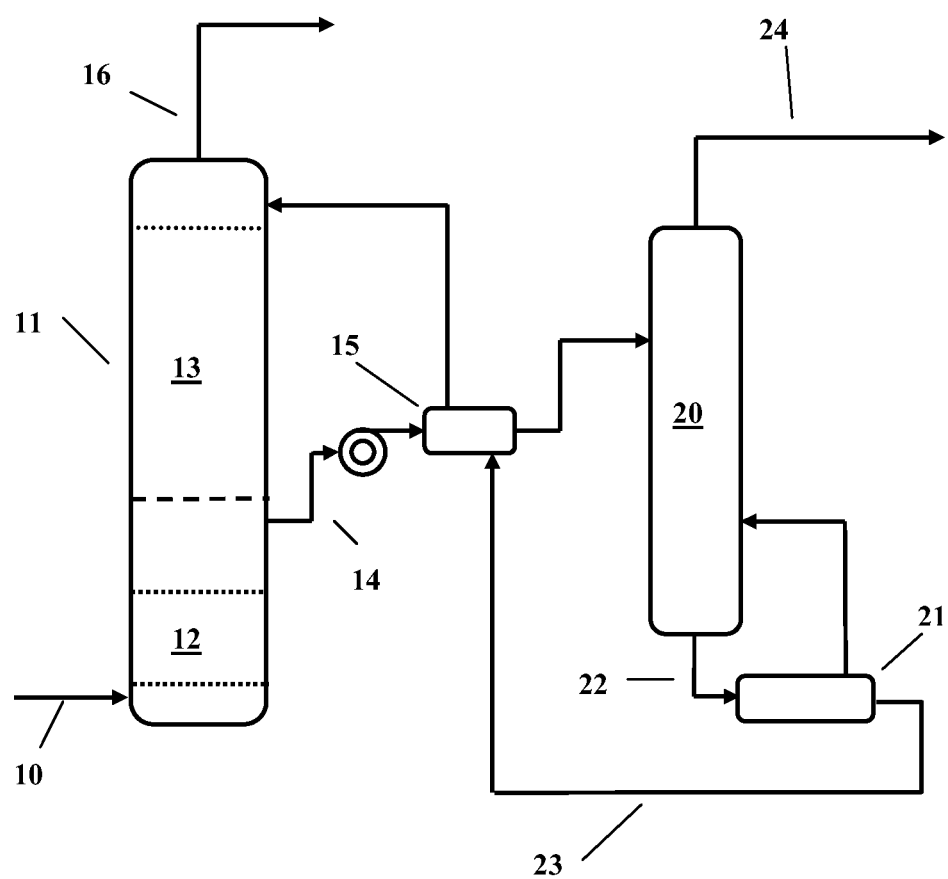
FIG. 1 is a simplified schematic of an embodiment of a cyclic separation unit suitable for separating $CO_2$ from a flue gas stream in accordance with a process of the present invention.

FIG. 1 shows a representative simplified schematic of a continuous cyclic gas separation unit which may be used for separating $CO_2$ from flue gas streams, natural gas streams, and other streams using the present ionic liquid absorption medium. The hot flue gas stream can enter the unit by way of line 10, entering near the bottom of absorber tower 11 and preferably passing through a cooling section 12, in which its temperature can be reduced by direct or indirect cooling to bring it to a suitable temperature for the sorption step which follows. In an alternative embodiment, the cooling of the hot flue gas stream can be achieved prior to the stream entering the absorber tower 11.

From here, the gas stream can pass into sorption section 13 in countercurrent contact with a descending stream of the ionic liquid sorbent. At least part of the $CO_2$, along with other gases which are amenable to absorption in the solution, can be absorbed into the ionic liquid resulting in a "rich" solution 14 containing the sorbed $CO_2$ which can be removed with a separation tray (not shown) near the lower end of the sorption section. The rich solution can then pass through heat exchanger 15 to desorption/regeneration tower 20 in which the $CO_2$ and other gases can be desorbed, in this case, by an increase in temperature, decrease in pressure, and/or the use of a purge (stripping gas), with agitation optionally but advantageously being provided by the stream of desorbed $CO_2$ and/or a purge gas. The rich solution can enter the tower at a level appropriate to its composition and can pass downwards as dissolved gases are removed. Heat for the regeneration tower can be supplied by reboiler 21 which can circulate a slipstream of solution taken from near the bottom of the regeneration tower by way of line 22. A stream of regenerated lean solution with a lower content of $CO_2$ can be taken from the reboiler in line 23 to pass through the other side of heat exchanger 15 before re-entering absorber tower 11 for passage through the gas stream. A gas stream of decreased $CO_2$ content can pass out of absorber tower 11 through line 16, and the desorbed $CO_2$ and other acid gases removed from the original gas stream can be removed in concentrated form through line 24 and taken to final sequestration or utilization (e.g., in industrial gas and/or in enhanced oil recovery processes).

Conventional equipment can be used to perform the various functions of the cyclic scrubbing process, such as monitoring and automatically regulating the flow of gases so that it can be fully automated to run continuously in an efficient manner.

Gas Stream

The gas streams particularly amenable to treatment by the present sorption process can include flue gas from the combustion of carbonaceous fuels and/or natural gas from subterranean and other sources. Flue gas may originate from the combustion of carbon-containing fossil fuels such as natural gas, oils, and/or lignite, as well as sub-bituminous, bituminous, and/or anthracite coals. Its $CO_2$ content may typically vary from about 6 to about 15 wt %, depending on the fuel, with the highest levels coming from hard coal combustion and the lowest from natural gas. Natural gas streams containing carbon dioxide may contain, in addition to methane and carbon dioxide, one or more other gases such as ethane, n-butane, i-butane, hydrogen, carbon monoxide, ethene, ethyne, propene, nitrogen, oxygen, helium, neon, argon, krypton, hydrogen sulfide, and carbonyl sulfide, as well as, in some cases, mercury and/or other metal contaminants, if they have not been removed by other pre-treatment. Other streams that can be treated by the present separation process can include syngas and shifted syngas produced in fuel gasification processes and gas streams from petrochemical plants whose composition can naturally depend on the process from which they are derived.

The amount of carbon dioxide in the gas mixture can typically vary from about at least 1 percent upwards; in many streams, it can be at least 10 percent and may even be higher, as with some gas streams from natural gas fields such as the LaBarge (Wyoming) field, where the gas is about 66.5 percent carbon dioxide, about 20.5 percent methane, about 7.4 percent nitrogen, about 5.0 percent hydrogen sulfide, and about 0.6 percent helium.

The gas stream may optionally also be subjected to dehumidification prior to contacting with the absorbent materials and processes described herein. The dehumidification can be carried out by conventional methods by the use of a drying agent/absorber guard bed upstream of the acid gas scrubbing unit, and/or by carrying out the $CO_2$ absorption at temperatures above 100° C. using an absorbent capable of being regenerated above the absorption temperature. For example, the dehumidification can be carried out by absorption over solid sorbents such as salt dryers, molecular sieves, silica gels, and/or aluminas.

Ionic Liquid Sorbents

Ionic liquids are liquids that contain essentially only ions rather than uncharged molecular species. Many ionic liquids remain liquid over a wide temperature range, often more than 300° C. They may have low melting points (as low as −96° C. has been reported), which can be attributed to large asymmetric cations that affect low lattice energies. The term is commonly used for salts whose melting point is relatively low (typically below 100° C.) which typically exhibit no measurable vapor pressure below their thermal decomposition temperature. The properties of ionic liquids result from the composite properties of the wide variety of cations and anions which may be present in these liquids. As a class of materials, ionic liquids are highly solvating for both organic and inorganic materials. Many of them are nonflammable, non-explosive and have high thermal stability. They are also recyclable, which can be helpful in reducing environmental concerns over their use.

Certain ionic liquids have previously been reported as physical sorbents for acid gases, operating under conditions of high pressure (*Fuel Cells Bulletin* 2005, Issue 9, 3-10), but have not been previously described as being capable of reaction with $CO_2$ under low pressures as described below.

A class of ionic liquids which has been found to be highly effective in the present $CO_2$ chemisorption process and which can therefore be preferred as sorbents include those compounds in which the cation contains a relatively acidic hydrogen atom bonded to a potentially nucleophilic carbon atom, as in cations having a C—H bond present as part of a conjugated —NC(H)N— structure and/or of an —NC(H)S— structure, more specifically designated as a —N═C(H)—N— structure and/or as an —N═C(H)—S— structure, for example, as in imidazolium, benzimidazolium, imidazolidinium (4,5-dihydro-1H-imidazolium), diazolium, and thiazolium salts with a hydrogen at the 2-position. The carbon referred to as nucleophilic can be qualified as potentially nucleophilic, since the carbon itself typically does not become a nucleophile until deprotonation of the acidic hydrogen. Thus, cations that can be effective to achieve chemisorption of $CO_2$ can advantageously be those in which the potentially nucleophilic carbon can bear a sufficiently acidic hydrogen (on a relative basis) to be susceptible to deprotonation by reaction of the cation and subsequent reaction with $CO_2$. Organic cations with $pK_a$ (acid dissociation equilibrium constant) values, as measured or predicted at ~25° C. in DMSO (dimethyl sulfoxide) solution and/or as measured in other solvent and converted to a DMSO value (referred to as DMSO equivalent scale), can be below about 26, for example from about 26 to about 15, from about 25 to about 16, or from about 24 to about 18 (based on the values in the Bordwell online $pK_a$ database, http://www.chem.wisc.edu/areas/reich/pkatable/index.htm); the lattermost range effectively covering the imidazolium compounds likely to provide enhanced/optimal $CO_2$ sorption by the ionic liquid. The salts derived from the imidazolium cation can be preferred, without being bound by theory, in some embodiments because their almost planar structure makes them have the character of amidines, particularly those derived from the 1,3-di(lower alkyl) imidazolium cations, where lower alkyl is $C_1$-$C_6$ (preferably $C_1$-$C_4$) alkyl. However, the 1,3-substituents of the imidazolium, benzimidazolium, and/or imidazolidinium cations and/or the N-substituents of the thiazolium cations may include or be other groups, such as aryl (including mesityl (2,4,6-trimethylphenyl)), higher alkyl (e.g., $C_7$-$C_{24}$), cycloalkyl, alkenyl (e.g., $C_1$-$C_6$), hydroxyalkyl (e.g., hydroxy-functionalized $C_1$-$C_6$), glycol ether, and substituted ($C_1$-$C_{16}$, e.g., $C_1$-$C_6$) alkyl, wherein a substituent of the alkyl group is a heteroatomic group, aryl, alkenyl, and/or other functionality. The imidazolium, benzimidazolium, thiazolium, and/or imidazolidinium cations may additionally or alternately bear substituents of similar nature at the ring carbon atom positions which do not react with $CO_2$ via the acidic hydrogen atom.

In the absence of a non-nucleophilic nitrogenous base promoter as described below, it appears that the $pK_a$ of the anion of the ionic liquid may be effective to vary the liquid's capability to react with $CO_2$. In this case, preferred anions for forming salts with the cations of the ionic liquid can include those in which the conjugate acid of the counterion has a $pK_a$ as measured and/or predicted at ~25° C. in aqueous solution (or as measured in other solvent and converted to an aqueous value, referred to as aqueous equivalent scale) of at least 0, for example of at least 2.0 or of at least 4.0. The anion of the ionic liquid salt can affect its ability to act as an agent for $CO_2$ capture, with more basic anions (such as acetate and/or thiocyanate) enhancing chemisorption and less basic anions (such as chloride) being ineffective and/or less effective in enhancing chemisorption. A useful means of making an adequate prediction of the $pK_a$ value of the counterion can include use of the ACD/PhysChem Suite™ (a suite of software tools for the prediction of basic physicochemical properties including $pK_a$), available from Advanced Chemistry Development, Inc., 110 Yonge Street, Toronto, Ontario, Canada M5C 1T4.

A preferred class of imidazolium salts includes the 1,3-dialkyl substituted imidazolium salts, with preference for the acetate salts as exemplified by 1-ethyl-3-methyl imidazolium acetate and 1-butyl-3-methyl imidazolium acetate, but other salts may be considered, such as those with halide, thiocyanate, and/or lower alkyl chain carboxylate anions (including acetate, propionate, hexanoate, octanoate, decanoate, and the like, as well as combinations thereof) as well as methanesulfonate, thiocyanate, salicylate, tetracholoroaluminate-aluminum chloride, dioctylsulfosuccinate, alkylbenzenesulfonate (alkyl=e.g., dodecyl), trifluoromethyl sulfonate, sulfate, bromide, methanesulfonate, alkylsulfate, tetrachloroaluminate, dicyanamide, hexafluoroantimonate, bis(trifluoromethylsulfonyl)imide, iodide, trifluorosulfonate, nitrate, tosylate, bis(2,4,4-trimethylpentyl)phosphinate, dibutylphosphate, lactate, and the like, as well as combinations thereof.

The ionic liquid can advantageously be selected to be substantially liquid over the temperature range at which the process is to be operated. Normally, the melting point of the liquid can therefore be at least ~10° C. (e.g., at least ~20° C.). Similarly, the boiling point can be sufficiently high to preclude significant evaporation at process operating temperatures, although this is unlikely to be a significant problem with most ionic liquids, which are generally characterized by high boiling points. The viscosity of the liquid, especially when containing the chemisorbed $CO_2$, can be a factor to be controlled in order to maintain pumpability. This may be determined empirically, considering also the potential use of solvent and/or the concentration of the chemisorbed species in the liquid sorbent under process conditions.

Taking imidazolium salts as an example, the sorption reaction with $CO_2$ can proceed by a reaction involving carboxylation at the C-2 carbon of the imidazole ring, as follows:

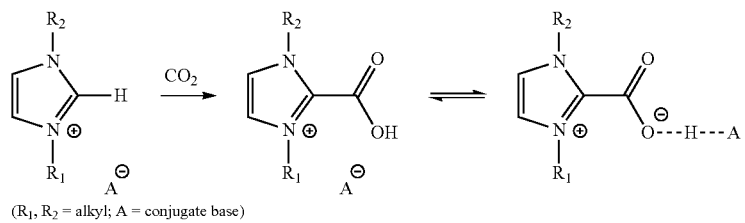

($R_1$, $R_2$ = alkyl; A = conjugate base)

This reaction between the $CO_2$ and the ionic liquid can proceeds easily (and qualitatively or quantitatively reversibly) upon heating to provide a convenient liquid-phase $CO_2$ capture-regeneration process. A limited temperature differential between the sorption and desorption steps can make for an energy efficient cyclic separation process with the potential for a substantially isothermal sorption-desorption cycle.

The C-carboxylation reaction between $CO_2$ and the ionic liquid can be promoted by the presence of a strong non-nucleophilic nitrogenous base having a pKa as measured and/or predicted at ~25° C. in aqueous solution (or as measured in other solvent and converted to an aqueous value, referred to as aqueous equivalent scale) of at least 10.0, for example at least 12.0 or at least 13.0. The ACD/PhysChem Suite™ may be used for making a prediction of the pKa value of the base in many cases. While bases such as tertiary amines with pKa's as low as about 10.0 can tend not to increase reaction yield with acetate-anion ionic liquids, they appear to have the potential to promote the reaction with thiocyanate-anion ionic liquids and other salts with counterions that may not favor optimal $CO_2$ sorption.

The base can advantageously be strong enough to influence the C-carboxylation product equilibrium effectively, but, on the other hand, advantageously not so strong as to sufficiently stabilize the carboxylated reaction product to the point of irreversibility, making desorption of the $CO_2$ from the carboxylated reaction product difficult or infeasible, e.g., by an inconveniently high temperature requirement. Additionally, the protonated form of the base should preferably remain quantitatively available to the ionic liquid for deprotonation/regeneration during the $CO_2$ desorption step of the cycle. Unacceptable bases can include those that give overly volatile protonated species, species that precipitate from the sorbent phase, species that may influence the reaction chemistry of $CO_2$ (e.g., hydroxide bases that form water upon protonation), and/or the like. The base should also preferably lack the propensity to act as a competing nucleophile towards $CO_2$ under the conditions of the sorption process. The non-nucleophilic nitrogenous bases selected according to the above criteria can function as excellent promoters for ionic liquid C-carboxylation with CO₂ in the chemisorption reaction.

When the non-nucleophilic nitrogenous base is used as a promoter for the ionic liquid chemisorption reaction, the base can appear to function as a Bronsted base, sequestering the proton of the C-carboxylation product (or at least influencing the C-carboxylation equilibrium) in such a way that larger yields can be obtained. The reaction, using an imidazolium salt as an exemplary ionic liquid, may be represented as:

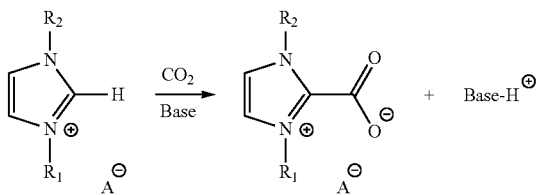

Non-nucleophilic nitrogenous bases useful for promoting the carboxylation reaction with the ionic liquid sorbents can include cyclic, multicyclic, and acyclic structures, such as imines, heterocyclic imines and amines, amidines (carboxamidines), including the N,N-di(lower alkyl) carboxamidines (e.g., lower alkyl preferably being $C_1$-$C_6$ alkyl), N-methyltetrahydropyrimidine, 1,8-diazabicyclo[5.4.0]undec-7-ene (DBU), 1,5,7-triazabicyclo[4.4.0]dec-5-ene (TBD), 7-methyl-1,5,7-triazabicyclo[4.4.0]dec-5-ene (MTBD), 1,5-diazabicyclo[4.3.0]non-5-ene (DBN), guanidines, including substituted guanidines of the formula $(R^1R^2N)(R^3R^4N)C=N-R^5$ where $R^1$, $R^2$, $R^3$, and $R^4$ are preferably lower alkyl (e.g., $C_1$-$C_6$) and $R^5$ is preferably H, such as 1,1,3,3-tetramethylguanidine, and combinations thereof. Additionally or alternately, other substituents, such as higher alkyl, cycloalkyl, aryl, alkenyl, and substituted alkyl as defined previously, and other structures may be used. These strong nitrogenous bases can typically be used on a 1:1 molar basis with the ionic liquid, although they may be present or used in molar excess with a higher reaction yield expected with a higher concentration of base in the solution. Because such bases they can be non-nucleophilic under the conditions of the sorption process, they may advantageously not engage in an N-carboxylation reaction with $CO_2$.

The selected ionic liquid can function to trap the $CO_2$ by chemisorption. The ionic liquids have not shown themselves to be effective for non-reactive physisorption at low pressures, typically below 1 to 2 bara (100–200 kPaa); although both chemisorption and physisorption may take place under such conditions, one or the other may be the predominant mode of $CO_2$ uptake, depending upon the sorbent medium and operating conditions. Such low pressures can be typical of those encountered in treating flue gases from hydrocarbon combustion processes; the present process lends itself well to post combustion flue gas $CO_2$ capture when $CO_2$ partial pressures are in the range of about 0.03 to 2 bara (about 0.5 to 30 psia, or about 3 to 200 kPaa).

The ionic liquid and the optional non-nucleophilic nitrogenous base may be used alone or taken up in an aprotic, preferably polar non-aqueous solvent of the type described in U.S. Application Ser. No. 61/381,351, filed Sep. 9, 2010, to which reference is made for a description of such solvents and their use in a $CO_2$ sorption process. In some embodiments, the use of the additional solvent can be less desirable, unless required to achieve a liquid of appropriate viscosity and pumpability, since it may diminish the sorption capacity of the system. If used, the solvent may typically be used in a ratio of up to about 1:1 molar (solvent:ionic liquid). Solvents such as toluene, dimethylsulfoxide, dimethylformamide, sulfolane, N-methyl-2-pyrrolidone, propylene carbonate, dimethyl ethers of ethylene and propylene glycols, tetrahydrofuran, and the like may accordingly be used.

The ionic liquids can additionally be capable of suppressing formation of the carbamate/bicarbonate product when water is present in the system. This can be significant, since, in the processing of flue gas as well as natural gas streams, water may be introduced into the system. However, as discussed prior, if significant amounts of water are present in the $CO_2$-containing feedstreams, it is recommended that such stream be dewatered/dehumidified prior to contacting with the absorbent materials and processes described herein.

Absorption/Desorption Conditions

The ionic liquid sorbent is not necessarily limited to removal of $CO_2$ but, in view of the system chemistry, can be capable of removing $H_2S$ and/or other acid gases such as those typically found in flue gas and/or wellhead natural gas.

The gas mixture containing carbon dioxide can originate from natural and/or artificial sources. The gas mixture can contain, in addition to carbon dioxide, one or more other gases, such as methane, ethane, n-butane, i-butane, hydrogen, carbon monoxide, ethene, ethyne, propene, nitrogen, oxygen, helium, neon, argon, krypton, hydrogen sulfide, and the like.

The constituents of the gas mixture may have different proportions. The amount of carbon dioxide in the gas mixture can typically be at least 1 percent by volume, for example at least 10 percent by volume or 50 percent by volume or greater. The gas mixture can include or be any of a variety of gases, for example, natural gas, flue gas, fuel gas, waste gas, air, or the like, or combinations thereof.

The absorption conditions (i.e., temperature, pressure, and/or the like) can advantageously be favorable for selectively absorbing the $CO_2$ component of the gas mixture to produce an absorption effluent gas stream having a reduced concentration of the absorbed component. The $CO_2$ loadings on the sorbent liquid in normal operation may typically be less than the equilibrium concentration observed in batch operation, since complete sorption may not occur, e.g., as a result of the kinetics of the process when in operation on a full scale and/or as a result of other factors such as contact efficiency between the gas phase and the sorbent liquid, corrosion concerns, and the like. The loadings actually achieved can depend on the ionic liquid and/or the optional non-nucleophilic nitrogenous base, the efficiency of the contacting in the absorber, the average residence time in the absorber, and/or other factors, but can be up to about 90% of the theoretical 1:1 molar loading may be achieved. The initial nucleophilic reaction between the amine and the $CO_2$ tends to be relatively fast, and the second rearrangement of the zwitterion can supposedly take place instantaneously, implying that the sorption should typically not be dependent on average residence time in the absorber; the effectiveness and efficiency of the sparging and contacting may, however, create practical barriers to achieving maximal $CO_2$ sorption.

For absorption processes herein, the temperature can typically be in the range from about 20° C. to about 90° C., for example from about 25° C. to about 75° C., from about 45° C. to about 75° C., or from about 45° C. to about 90° C., with greater sorption typically achieved at lower temperatures within these ranges. In most cases, therefore, a maximum temperature for the sorption can be about 80° C. (or alternately about 70° C.). The sorption temperature can typically correlate in an inverse manner with the partial pressure of the $CO_2$ in the entering gas stream; higher $CO_2$ partial pressures can enable higher sorption temperatures to be used. For example, the lowest possible sorption temperature can be beneficial in treating feedstreams (e.g., flue gas) with ~100 mbar (~10 kPa) partial pressure of $CO_2$. Conversely, absorption can be achieved at much higher temperatures, possibly over 100° C., with feedstreams (e.g., natural gas streams) with much higher $CO_2$ pressure. For flue gas streams, for instance, it can be desirable to operate towards the higher end of the temperature range, since the flue gas can tend to be hot, unless initially cooled to make sorption more favorable. In each case, however, the absorption temperature can be tailored for the sorbent system in use and with regard to the desorption temperature required for that system. The possibility opened up by the use of low sorption temperatures from about 20° C. to about 50° C. or from about 20° C. to about 30° C., however, can offer the possibility of using desorption temperatures below 100° C., e.g., about 75° C. to about 90° C. or about 50° C. to about 90° C., respectively, with consequent savings in process energy requirements.

The absorption pressure can be in the range from about 0.1 barg (about 10 kPag) to about 20 barg (about 2 MPag), for example from about 0.1 barg (about 10 kPag) to about 10 barg (about 1 MPag). The partial pressure of carbon dioxide in the gas mixture can vary according to the gas composition and/or the pressure of operation, but can typically be from about 0.1 barg (about 10 kPag) to about 20 barg (about 2 MPag), for example from about 0.1 barg (about 10 kPag) to about 10 bar (about 1 MPag). The gas mixture can be contacted counter-currently or co-currently with the absorbent material at a gas hourly space velocity (GHSV) from about 50 (S.T.P.)/hour to about 50,000 (S.T.P.)/hour.

The low pressure of flue gas can, in general, represent a significant limitation for $CO_2$ recovery, since the $CO_2$ can be absorbed much more easily into solvents at higher pressures, but the cost of compression can be relatively high and can tend not to be favored with the present sorption systems with their high sorption capacities. The pressure when treating flue gas which enters from the combustion source at a low pressure is unlikely to exceed about 1 atmosphere gauge (~100 kPag) unless a separate means is utilized to increase pressure. Natural gas recovery and processing is commonly at a much higher pressure and may enter the treatment process at a pressure typically in the range from about 1 atm (~100 kPag) to about 90 atm (~9.1 MPag), with the actual value selected being dependent on pipelining specifications and/or the extent to which it is desired to eliminate recompression following treatment, for example.

The carbon dioxide can be desorbed from the absorbent material by one or more of several methods. One possibility can be to desorb the carbon dioxide by means of stripping with an inert (generally non-reactive) gas stream such as nitrogen in the regeneration tower. The reduction in the $CO_2$ partial pressure that can occur on stripping can promote desorption of the $CO_2$, and, when this expedient is used, a significant pressure reduction may not be required, although the pressure may be reduced for optimal/better stripping, suitably to the levels used in pressure swing operation. Additionally or alternately, a pressure swing process may be used to reduce the pressure on the liquid absorbent to a relatively lower value than that prevailing in the sorption phase.

When carrying out desorption by inert gas sparging and/or pressure swing operation, the temperature may be maintained at a value at or close to that used in the adsorption step. Desorption can, however, be favored by an increase in temperature, with or without stripping and/or a decrease in pressure.

When the absorbent is loaded with $CO_2$ to a satisfactory level, the sorbent system can be regenerated by desorption of the $CO_2$. Regeneration can be conveniently effected in a regeneration tower, e.g., by reducing the partial pressure of the $CO_2$ by stripping with a non-reactive gas such as nitrogen, by increasing the temperature of the amine rich stream from the absorber, and/or by reducing the pressure, or a combination of any of these expedients. During this step, the $CO_2$ may be removed and can be taken to utilization and/or sequestration and the sorbent medium freed for recycle to the absorber. An additional or alternative option can be to decompose the carbamate/carbamic acid with substantially pure $CO_2$ (previously isolated) at ~1 atm (~100 kPa partial pressure) or higher at relatively high temperatures, typically at least 120° C., at which the carbamic acid/carbamate reaction product can be decomposed. Stripping with a $CO_2$ stream at a desorption temperature of at least 120° C. and at a pressure greater than ~1 atm (~100 kPa partial pressure) may give a significant advantage in order to remove any water that may have entered the system since under these conditions; water can thus be removed from the amine/ionic liquid solution and can be separated from the $CO_2$ in a further downstream separation step, e.g., a pressure swing operation, for instance at an elevated temperature above ambient.

In principle, the ionic liquid sorbent medium containing the base can manage trace amounts of water entering with the gas stream by using a molar excess of base, which can form a bicarbonate product with $CO_2$ and $H_2O$, while the ionic liquid can react with $CO_2$ and the majority of base. The bicarbonate formed by reaction of the water with the excess base can be decomposed at temperatures above ~100° C. (typically at ~100-140° C., depending on the basicity of the base).

In any event, the desorption temperature can typically be about 120° C. or less, and successful desorption may be achievable at temperatures not exceeding about 100° C. (e.g., from about 70° C. to about 90° C., from about 70° C. to about 95° C., from about 75° C. to about 90° C., or from about 75° C. to about 95° C.), with lower values (e.g., from about 30° C. to about 70° C., from about 30° C. to about 50° C., or from about 50° C. to about 70° C.) if sorption is carried out at low temperature. In the non-aqueous environment using the ionic liquid solvent, stripping can be feasible with or without purge gas at relatively lower temperatures. The possibility of desorption at lower temperatures can offer the potential for isothermal (or near isothermal) stripping using a purge gas at a temperature the same as, or not much higher than, the sorption temperature (for example, at a temperature not more than 30° C. higher than the sorption temperature); in favorable cases, it may be possible to attain a sorption/desorption temperature differential of no more than 20° C.

As noted above, the flue gases which may be treated by the present process include water from the combustion process; untreated natural gas may be similar. With desorption/regeneration temperatures above 100° C., any water entering the system will be kept at a low level and for this reason competing reactions will not be significant. Water entering the low temperature processes with desorption/regeneration operating at temperatures under 100° C. may be driven off by the stripping which takes place during the regeneration. The entering gas stream can, however, be dehumidified prior to contacting with the sorbent solution. The dehumidification can be carried out by conventional methods. For example, the dehumidification can be carried out by absorption over solid sorbents such as molecular sieves, silica gels or aluminas or by cooling to condense the water content of the stream.

It should be appreciated that conventional equipment can be used, in whole or in part, to perform the various functions of the non-aqueous amine scrubbing processes/steps described herein, such as monitoring and/or automatically regulating the flow of gases, e.g., to enable fully automated and/or continuous process control in an efficient manner.

EXAMPLES

Example 1

Figure 2:
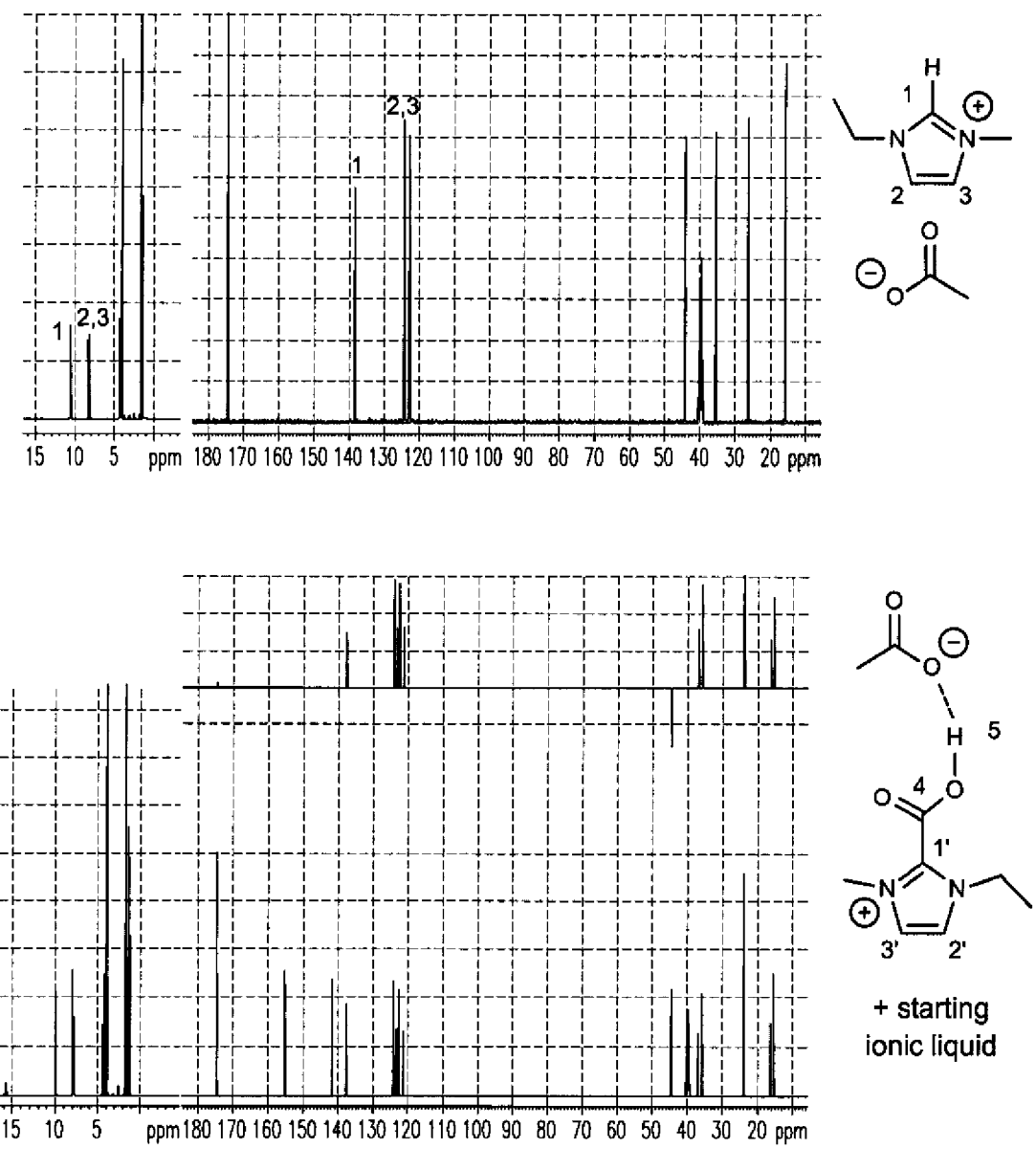
FIG. 2 shows $^{13}C$ NMR spectra of the ionic liquid of Example 1 before and after chemical reaction with $CO_2$.

Reversible $CO_2$ Chemisorption by C-Carboxylation of 1-Ethyl-3-methylimidazolium Acetate An approximately 1:2 molar solution of 1-ethyl-3-methylimidazolium acetate in $d_6$-DMSO was prepared in a ~5 mm NMR tube fitted with a plastic cap and capillary dip tube. The NMR tube was placed inside a ~5 mm narrow-bore Bruker Avance III™ 400 MHz NMR spectrometer with a QNP probe. $CO_2$ (~1 atm, or ~100 kPa partial pressure, and at ~3-5 cc/min flow, as measured by a Brooks 5896™ flow controller) was bubbled through the room temperature (~20-25° C.) solution for approximately 3 hours. Comparison of the $^1H$ NMR spectra before and after carboxylation (FIG. 2) shows that the imidazolium C2 C—$\underline{H}$ proton (~10.55 ppm) decreased in integration, and a new proton resonance attributed to the carboxylated product appeared at ~15.76 ppm. The $^{13}C$ NMR spectra showed that new C2 ($\underline{C}$—$CO_2^-$) and carboxylate (C—$\underline{C}O_2^-$) resonances appeared at ~141.55 and ~155.12 ppm, respectively, with splitting of the imidazolium structural carbons and protons into unreacted and carboxylated species (FIG. 2). Integration of the carbon spectrum showed ~40 mol % formation of the carboxylated product that corresponded to ~10.3 wt % $CO_2$ loading per 1-ethyl-3-methylimidazolium acetate. Additional $^1H$-$^{13}C$ single bond correlation (HSQC; Heteroatom Single Quantum Correlation) and DEPT-135 (Distortionless Enhanced Polarization Transfer) NMR experiments showed that the carbons represented by the new peaks at ~141.55 and ~155.12 ppm, respectively, did not appear to have protons directly attached. The new proton peak at ~15.76 ppm also appeared not to be attached to any carbons. These observations suggested a C-carboxylated structure (C—$CO_2H$ or C—$CO_2^-$).

The uptake experiment was repeated using neat ionic liquid in a ~10 mm NMR tube with in-situ monitoring at intermediate stages of the reaction. Qualitatively identical results were obtained, with a carboxylate product loading of ~36.9 mol % that corresponds to ~9.5 wt % $CO_2$ loading per 1-ethyl-3-methylimidazolium acetate. Flashing of the solution with an $N_2$ purge at ~90° C. was done to regenerate the original 1-ethyl-3-methylimidazolium acetate.

Figure 3A:
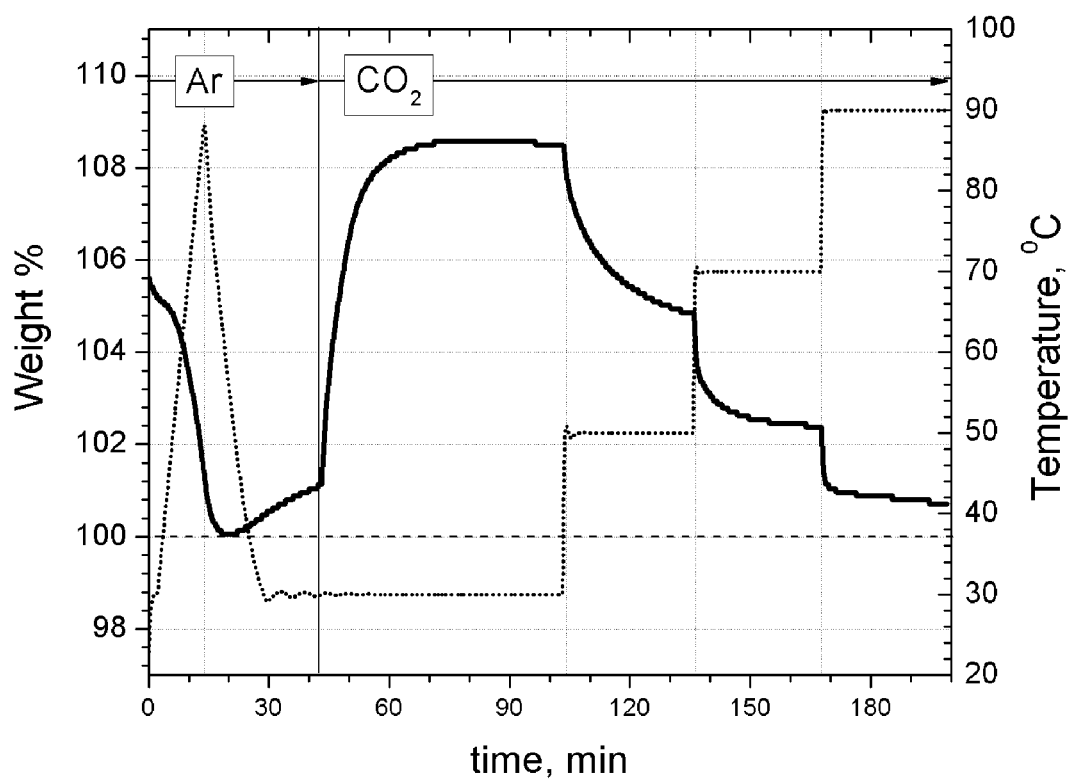
FIGS. 3a and 3b are graphs showing the TGA results of neat $CO_2$ sorption and desorption of the ionic liquid in Example 1.
Figure 3B:
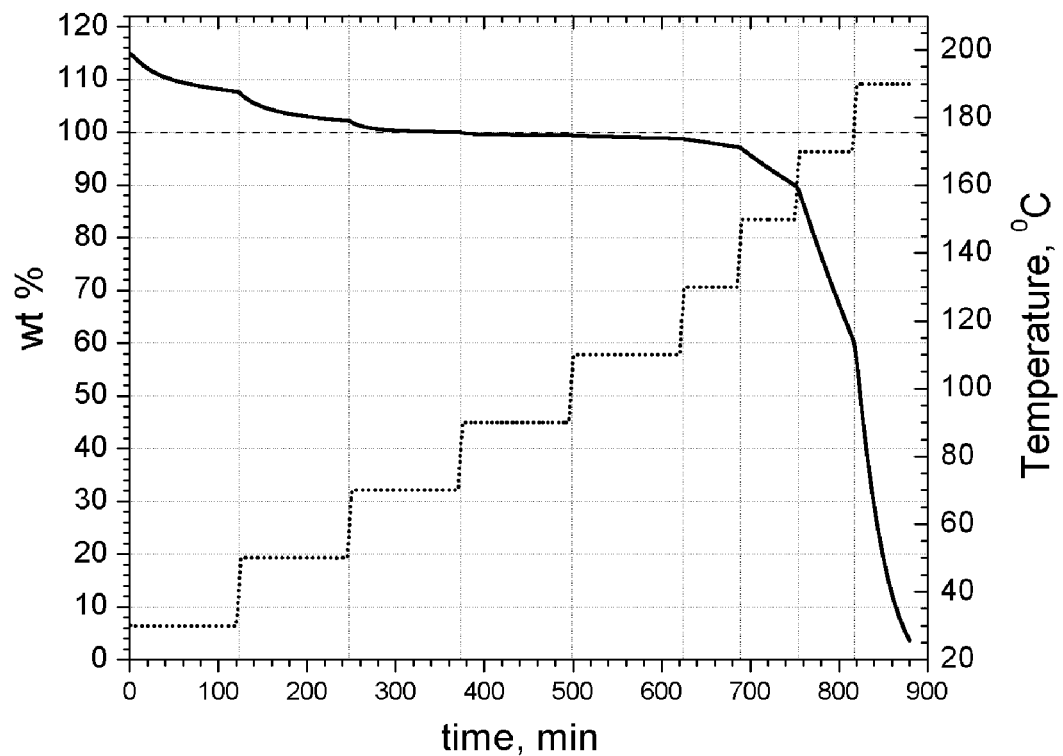

FIGS. 3a and 3b represent the results of TGA (Thermo-Gravimetric Analysis) experiments on $CO_2$ uptake/release with neat 1-ethyl-3-methylimidazolium acetate. In both graphs, the dashed step curve represents temperature (right hand axis) and the continuous curve weight percent loss (left hand axis). After pretreatment of the neat 1-ethyl-3-methylimidazolium acetate in argon at ~100° C., the sample was exposed to $CO_2$ flow at ~1 atm (~100 kPa) at ~30° C. After ~30 minutes in $CO_2$, the sample gained about 7.5% in weight (FIG. 3a), which corresponds to C-carboxylation of ~29.2% of the acetate salt, in good agreement with the NMR experiments. $CO_2$ uptake was lower at elevated temperatures (~50° C., ~70° C., ~90° C.) as indicated by the step line of the graph referring to the right hand coordinates.

In order to study the desorption properties of the system, the acetate salt was saturated with $CO_2$ and then exposed to an inert (nitrogen) atmosphere to decrease the $CO_2$ partial pressure. FIG. 3b shows that $CO_2$ desorption from the liquid was complete by ~90° C., achieved after ~500 minutes; decomposition of the ionic liquid started at ~140-150° C.

Example 1.1

Reversible $CO_2$ Chemisorption of 1-ethyl-3-methylimidazolium Acetate Promoted by 1,1,3,3-tetramethylguanidine (TMG)

Figure 4:
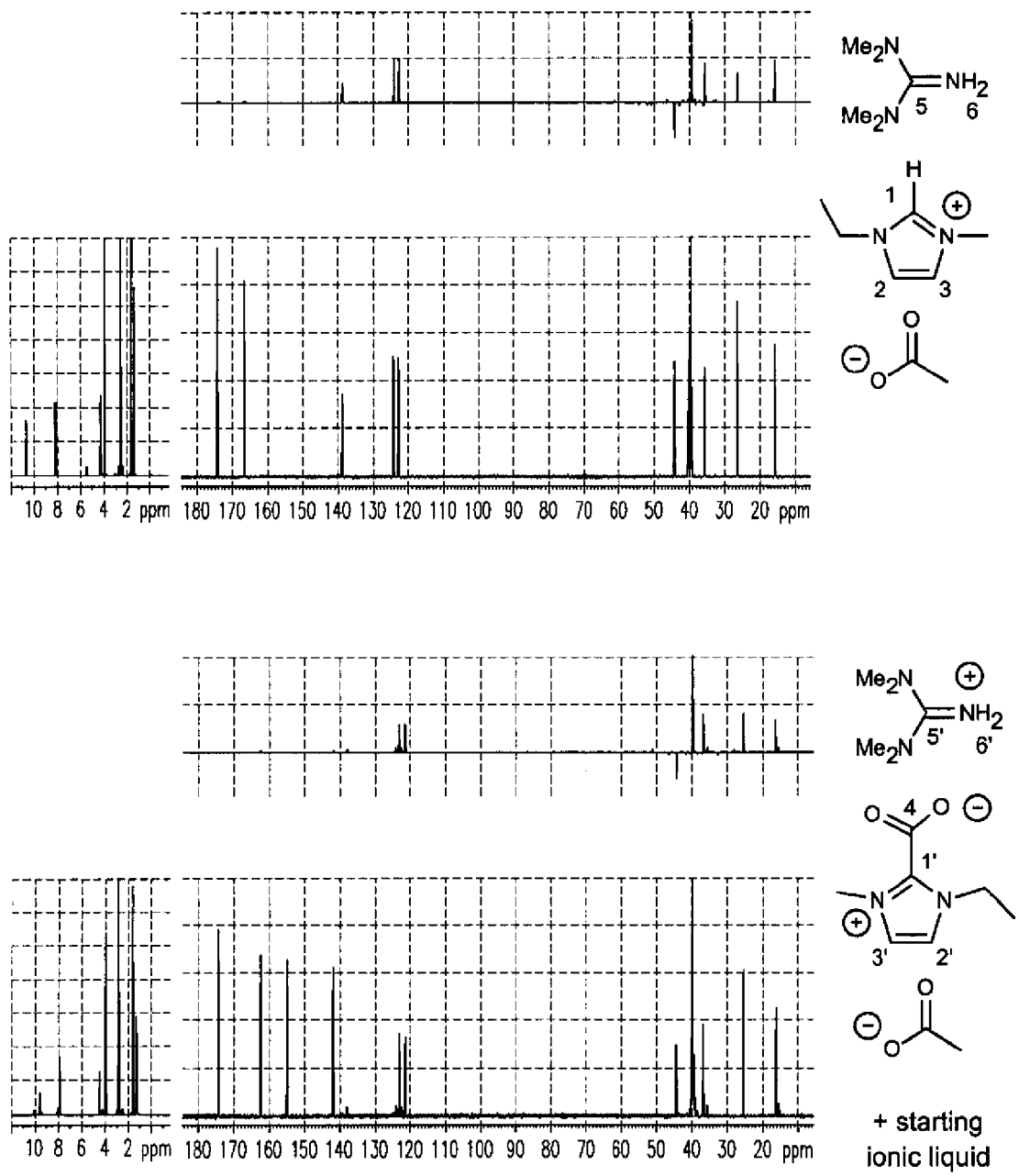
FIG. 4 shows $^{13}C$ and $^1H$ NMR spectra of the ionic liquid—non-nucleophilic nitrogenous base solution of Example 1.1 before and after chemical reaction with $CO_2$.

A procedure similar to Example 1 was carried out using a $d_6$-DMSO solution containing ~50 wt % of an approximately 1:1 molar mixture of 1-ethyl-3-methylimidazolium acetate and 1,1,3,3-tetramethylguanidine (TMG, pKa ~15.20). $CO_2$ was bubbled through the room temperature (~24° C.) solution for approximately 2 hours. The $^1H$ NMR spectrum showed that the C—H proton of the ionic liquid (~10.66 ppm) and the N—H proton of the TMG (~5.50 ppm) were apparently represented by a broad peak at ~9.62 ppm after reaction with $CO_2$. A small peak at ~10.3 ppm appeared to represent the C2 C—H proton of the unreacted ionic liquid. In the $^{13}C$ NMR spectrum, new C2 ($\underline{C}$—$CO_2^-$) and carboxylate (C—$\underline{C}O_2^-$) resonances appeared at ~141.77 and ~154.89 ppm, respectively, with splitting of the imidazolium structural carbons and protons into unreacted and carboxylated species (FIG. 4). At the same time, the C=N carbon resonance of TMG shifted to ~162.35 ppm (from ~166.49), appearing to confirm participation of TMG in the chemical reaction. Integration of the carbon spectrum showed ~91.2 mol % formation of the carboxylated product. Additional DEPT-135 NMR experiments showed that the carbons represented by the new peaks at ~141.77 and ~154.89 ppm, respectively, did not appear to have protons directly attached. These observations suggested a C-carboxylated structure (C—$CO_2^-$ or C—$CO_2H$) on the ionic liquid, which appeared to be stabilized by protonated TMG (TMG-$H^+$). Flashing the solution with an $N_2$ purge at room temperature (~24° C.) showed significant regeneration of the original 1-ethyl-3-methylimidazolium acetate and $CO_2$ desorption.

Comparative Example 1.2

Reversible $CO_2$ Chemisorption of 1-ethyl-3-methylimidazolium Acetate Promoted by bis[2-(N,N-dimethylamino)ethyl]ether A procedure similar to Example 1 was carried out using a $d_6$-DMSO solution containing ~50 wt % of an approximately 2:1 molar (~1:1 normal) mixture of 1-ethyl-3-methylimidazolium acetate and the bifunctional tertiary amine bis[2-(N,N-dimethylamino)ethyl]ether (pK$_a$ ~9.12; a tertiary amine unable to participate in carbamate/carbamic acid formation with $CO_2$). Comparison of the $^1H$ NMR spectra (not shown) before and after carboxylation indicated that the C2 C—H proton (~10.55 ppm) decreased in integration, and a new proton resonance appeared at ~15.76 ppm. The $^{13}C$ NMR spectra (not shown) indicated that new C2 ($\underline{C}$—$CO_2^-$) and carboxylate (C—$\underline{C}O_2^-$) resonances appeared at ~141.80 and ~154.95 ppm, respectively, with splitting of the imidazolium structural carbons and protons into unreacted and carboxylated species. Integration of the carbon spectrum indicated ~36.9 mol % formation of the carboxylated product. Since this yield was very similar to that obtained in neat ionic liquid solution in the absence of the amine, the conclusion was drawn that tertiary amine does not appear to promote C-carboxylation.

Example 2

Reversible $CO_2$ Chemisorption by C-carboxylation of 1-butyl-3-methylimidazolium Acetate A procedure similar to Example 1 was carried out using neat 1-butyl-3-methylimidazolium acetate with a drop of $d_6$-DMSO. After a ~13 hour $CO_2$ purge, the C2 C—H proton (~10.77 ppm) in the $^1$H NMR spectrum (not shown) appeared to decrease in integration and move upheld, with a new $CO_2\underline{H}$ resonance appearing at ~15.04 ppm. New $^{13}$C NMR C2 ($\underline{C}$—$CO_2H$) and carboxylate ($CO_2^-$) resonances (not shown) appeared at ~141.71 and ~155.24 ppm, respectively, with splitting of the imidazolium structural carbons and protons into unreacted and carboxylated species. Integration of the carbon spectrum indicated ~35 mol % formation of the carboxylated product. A peak at ~159.9 ppm may represent formation of bicarbonate, possibly due to a trace amount of water in the ionic liquid.

Example 2.1

Vapor-Liquid Equilibrium of 1-butyl-3-methylimidazolium Acetate and $CO_2$ in $d_6$-DMSO An approximately 49.6 wt % solution (~3 molar) of 1-butyl-3-methylimidazolium acetate in $d_6$-DMSO was heated to ~45° C. and then treated with a continuous flow of ~1 vol % $CO_2$ in $N_2$ at ~1 atm (~100 kPag), as described in the General Procedure. The solution was next treated with ~10 vol % $CO_2$ in $N_2$ at ~1 atm (~100 kPag), and finally with ~100 vol % $CO_2$ at ~1 atm. The equilibrium loading of $CO_2$ at these conditions was ~12.2 mol %, ~26.7 mol %, and ~35.0 mol %, respectively, and represented an 1-butyl-3-methylimidazolium acetate/$CO_2$ vapor-liquid equilibrium at ~10 mbar (~1 kPa), ~100 mbar (~10 kPa), and ~1 bar (~100 kPa) of $CO_2$ at ~45° C.

The same procedure was carried out with fresh ~3 molar (~49.6 wt %) 1-butyl-3-methylimidazolium acetate in DMSO-$d_6$ solution at ~65° C. and ~90° C. The monitoring results shown in FIG. 6 indicated a strong temperature dependence of $CO_2$ uptake capacity. This result confirmed the relatively low stability of the reaction product, which can be beneficial for achieving lower regeneration energy.

Example 2.2

Vapor-Liquid Equilibrium of 1-butyl-3-methylimidazolium Acetate and $CO_2$ Promoted by 1,1,3,3-tetramethylguanidine (TMG)

An approximately 3 molar solution of 1-butyl-3-methylimidazolium acetate (~53 wt %) and ~3 molar of 1,1,3,3-tetramethylguanidine (~34 wt %) in $d_6$-DMSO was heated to ~45° C. and then treated with a continuous flow of ~1 vol % $CO_2$ in $N_2$ at ~1 atm (~100 kPag), as described in the General Procedure. The solution was next treated with ~10 vol % $CO_2$ in $N_2$ at ~1 atm (~100 kPag), and finally with ~100 vol % $CO_2$ at ~1 atm. The equilibrium loading of $CO_2$ at these conditions was ~33.7 mol %, ~60.7 mol %, and ~70.2 mol %, respectively, and represented an 1-butyl-3-methylimidazolium acetate/$CO_2$ vapor-liquid equilibrium at ~10 mbar (~1 kPa), ~100 mbar (~10 kPa), and ~1 bar (~100 kPa) of $CO_2$ at ~45° C.

The same procedure was carried out with a fresh mixture of 1-butyl-3-methylimidazolium acetate and TMG in DMSO-$d_6$ solution at ~65° C. The monitoring results shown in FIG. 7 indicated a significantly higher $CO_2$ uptake capacity as a result of promotion with the strong base, TMG. The $CO_2$ uptake capacity appeared to be comparable to alkanolamines, and the strong temperature dependence of the vapor-liquid equilibrium for the given system confirmed potential application of neat or promoted ionic liquids for cost effective $CO_2$ capture from various sources, including flue and/or natural gas.

Example 3

(Control) Attempted $CO_2$ Chemisorption by C-carboxylation of 1-ethyl-3-methylimidazolium Thiocyanate A procedure similar to Example 1 was carried out using either neat 1-ethyl-3-methylimidazolium thiocyanate or ~15 wt % 1-ethyl-3-methylimidazolium thiocyanate in $d_6$-DMSO. In contrast to Examples 1 and 2, after $CO_2$ purge for ~1 hour, no carboxylation was observed. The C2 C—H proton (~8.98 ppm) and carbon (~136.63 ppm) resonances in the $^1$H and $^{13}$C spectra did not appear to split or move (not shown). One very minor new $CO_2$ resonance was observed at ~124.4 ppm, possibly representing physisorbed $CO_2$ molecules.

Example 3.1

Reversible $CO_2$ Chemisorption of 1-ethyl-3-methylimidazolium Thiocyanate Promoted by TMG A procedure similar to Example 1 was carried out using a $d_6$-DMSO solution containing ~50 wt % of an approximately 1:1 molar mixture of 1-ethyl-3-methylimidazolium thiocyanate and TMG. $CO_2$ was bubbled through the room temperature (~24° C.) solution for approximately 13 hours. The C—H proton of the ionic liquid (~9.22 ppm) and N—H proton of TMG (~5.25 ppm), after reaction with $CO_2$, presented a single peak at ~8.07 ppm in the $^1$H NMR spectrum (not shown). New C2 ($\underline{C}$—$CO_2^-$) and carboxylate (C—$\underline{C}O_2^-$) resonances appeared at ~141.43 and ~155.10 ppm, respectively, in the $^{13}$C NMR spectrum, with splitting of the imidazolium structural carbons and protons into unreacted and carboxylated species (not shown). Simultaneously, the C=N carbon resonance of TMG shifted to ~161.89 ppm (from ~166.65), apparently confirming participation of TMG in the chemical reaction. In contrast to Example 3 (ionic liquid without added TMG), integration of the carbon spectrum indicated ~79.5 mol % formation of the carboxylated product. Additional DEPT-135 NMR experiments indicated that the carbons represented by the new peaks at ~141.43 and ~155.10 ppm, respectively, did not appear to have protons directly attached. These observations suggested a C-carboxylated structure (C—$CO_2^-$ or C—$CO_2H$) on the ionic liquid, which appear to be stabilized by protonated TMG (TMG-$H^+$). Flashing the solution with an $N_2$ purge at room temperature (~24° C.) for ~7 hours showed almost complete regeneration of the original 1-ethyl-3-methylimidazolium thiocyanate and $CO_2$ desorption.

Comparative Example 4

Attempted CO$_2$ Chemisorption of Neat 1-methylimidazolium Chloride

A procedure similar to Example 1 was carried out using neat 1-methylimidazolium chloride. Due to the relatively high melting point of this compound (~69° C.), characterization and CO$_2$ saturation were performed at ~80° C. In contrast to Examples 1 and 2, after CO$_2$ purge for ~1 hour, no carboxylation was observed. The C2 C—H proton (~9.26 ppm; NH proton appeared at ~14.43 ppm) and carbon (~135.62 ppm) resonances in the respective $^1$H and $^{13}$C NMR spectra did not appear to split or move (not shown). No new CO$_2$ resonance attributable to chemisorbed carbon dioxide products was observed.

Comparative Example 5

Figure 5:
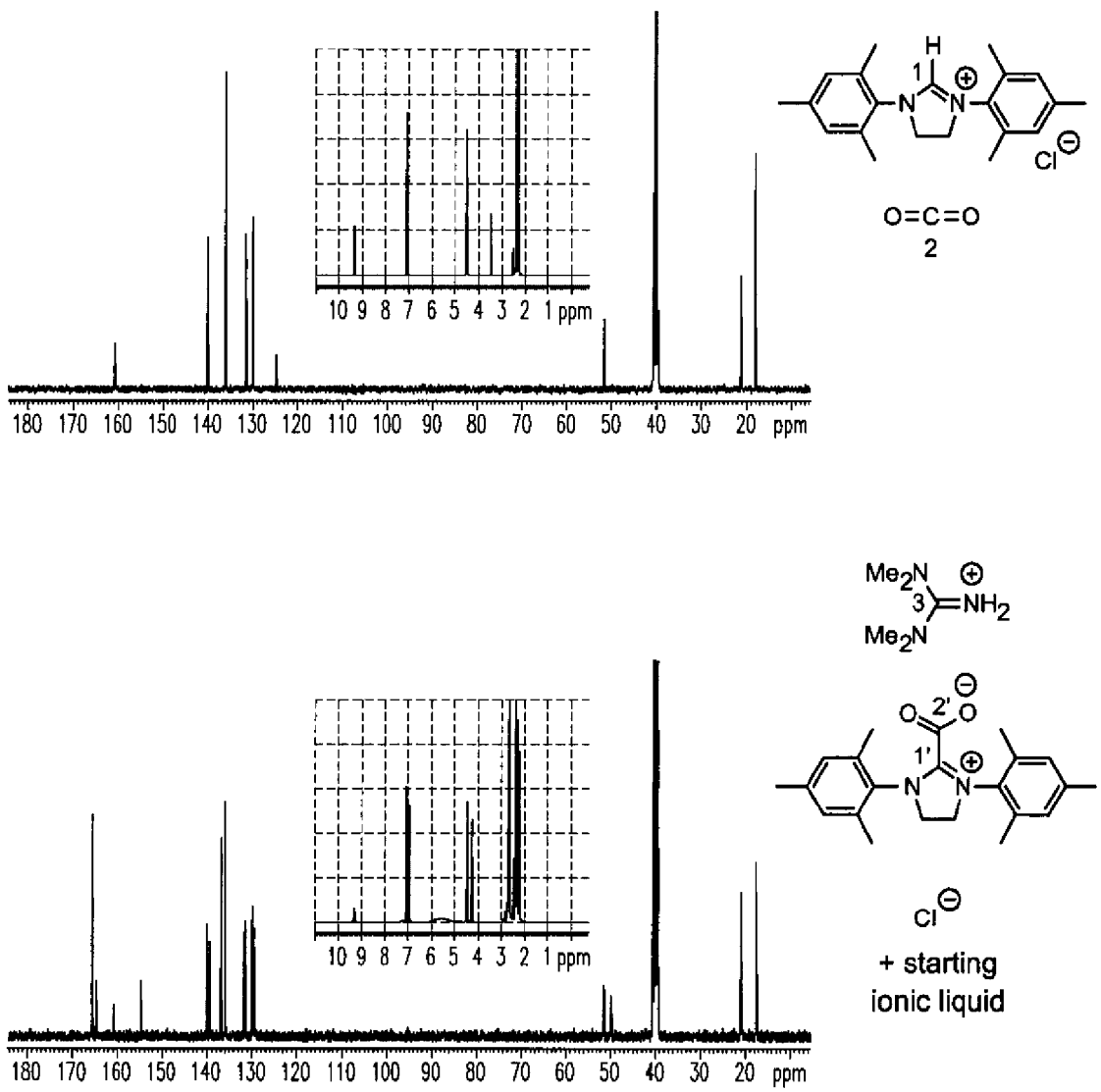
FIG. 5 shows the $^1H$ and $^{13}C$ NMR spectra of 1,3-bis(2,4, 6-TMP)imidazolidinium chloride in DMSO-$d_6$ solution after treatment with $CO_2$ (top) and after adding TMG (bottom) (Examples 5 and 5.1).

Attempted CO$_2$ Chemisorption of 1,3-bis(2,4,6-trimethylphenyl)imidazolidinium Chloride A procedure similar to Example 1 was carried out using a ~10 wt % solution of 1,3-bis(2,4,6-trimethylphenyl)imidazolidinium chloride (1,3-bis(2,4,6-trimethylphenyl)-4,5-dihydro-1H-imidazolium chloride) in d$_6$-DMSO. In contrast to Examples 1 and 2, after CO$_2$ purge for ~1 hour, no carboxylation was observed. The imidazolidinium C2 C—H proton (~9.34 ppm) and carbon (~139.92 ppm) resonances in the $^1$H and $^{13}$C spectra did not appear to split or move (FIG. 5, top). One new CO$_2$ resonance was observed at ~124.65 ppm, possibly representing physisorbed CO$_2$ molecules in the ionic liquid solution (CO$_2$:ionic liquid ratio was ~0.38:1).

Example 5.1

CO$_2$ Chemisorption of 1,3-Bis(2,4,6-trimethylphenyl)-imidazolidinium Chloride Promoted by TMG For this example, a ~10 wt % solution of 1,3-bis(2,4,6-trimethylphenyl)-imidazolidinium chloride in d$_6$-DMSO was saturated with CO$_2$ as described in Example 5. As confirmed by $^{13}$C NMR, CO$_2$ was physisorbed/dissolved in the ionic liquid solution (FIG. 5, top). TMG (~2:1 TMG:ionic liquid molar ratio) was added to the solution. The resulting mixture was analyzed after about 20 minutes. The C—H proton of the ionic liquid (~9.33 ppm) did not appear to change its position in the $^1$H NMR spectrum (FIG. 5, bottom). New C2 (C—CO$_2^-$) and carboxylate (C-CO$_2^-$) resonances appeared at ~139.34 and ~154.65 ppm, respectively, in the $^{13}$C NMR spectrum, with splitting of the imidazolidinium structural carbons into unreacted and carboxylated species (FIG. 5, bottom). This result appeared to confirm the chemical reaction of the physisorbed CO$_2$ with the ionic liquid in the presence of the strong base, TMG, as a promoter. Simultaneously, the C=N carbon resonance of TMG appeared to split into two peaks at ~165.65 ppm and ~164.62 ppm; the latter resonance appears to confirm participation of TMG in the chemical reaction. In contrast to Example 5 (ionic liquid without added TMG), integration of the carbon spectrum indicated approximately 45.4 mol % formation of carboxylated product. Further treatment with CO$_2$ led to precipitation of reaction products (presumably due to further reaction of unreacted ionic liquid with CO$_2$). Analysis of these reaction products was not conducted.

The results of Examples 1 to 5 are tabulated in Table 1.

TABLE 1

Summary of CO$_2$ Uptake Results of Examples 1-5

| Ionic liquid (Ex. No.) | Cosolvent/amine | =C—H ppm shift, $^1$H NMR (rel. d$_6$-DMSO) | pK$_a$ of counterion conjugate acid (1) | Mol % carbox. (% after desorption) |
|---|---|---|---|---|
| 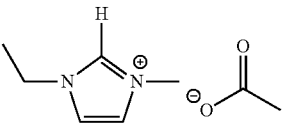 1-ethyl-3-methylimidazolium acetate (1) | d$_6$-DMSO | 10.55 | 4.75 | 40 |
| 1-ethyl-3-methylimidazolium acetate (1) | neat | 10.67 | 4.75 | 36.9 (0) |
| 1-ethyl-3-methylimidazolium acetate (1.1) | d$_6$-DMSO/TMG | 10.66 | 4.75 | 91.2 (22) |
| 1-ethyl-3-methylimidazolium acetate (1.2) | d$_6$-DMSO/bis[2-(N,N-Me$_2$-amino)ethyl]ether | 10.55 | 4.75 | 36.9 |
| 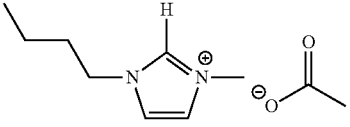 1-ethyl-3-methylimidazolium acetate (2) | neat (drop d$_6$-DMSO) | 10.77 | 4.75 | 35 |

TABLE 1-continued

Summary of $CO_2$ Uptake Results of Examples 1-5

| Ionic liquid (Ex. No.) | Cosolvent/amine | =C—H ppm shift, $^1$H NMR (rel. $d_6$-DMSO) | pK$_a$ of counterion conjugate acid (1) | Mol % carbox. (% after desorption) |
|---|---|---|---|---|
| 1-ethyl-3-methylimidazolium thiocyanate (3) | $d_6$-DMSO | 8.98 | −1.85 (2) | 0 |
| 1-ethyl-3-methylimidazolium thiocyanate (3) | neat | 8.91 | −1.85 (2) | 0 |
| 1-ethyl-3-methylimidazolium thiocyanate (3.1) | $d_6$-DMSO/TMG | 9.22 | −1.85 (2) | 79.5 (3) |
| 1-methylimidazolium chloride (4) | neat | 9.26 | −3 | 0 |
| 1,3-bis(2,4,6-TMP)-imidazolidinium chloride (5) | $d_6$-DMSO | 9.34 | −3 | 0 |
| 1,3-bis(2,4,6-TMP)-imidazolidinium chloride (5.1) | $d_6$-DMSO/TMG | 9.38 | −3 | >45 |

*TMP = trimethylphenyl.
1. pK$_a$ values as reported in MacFarlane et al., *Acids and Bases in Ionic Liquids*, ACS Symp. Ser. [2003], 856 [Ionic Liquids as Green Solvents], pp. 264-276; see Table 1, p.272.
2. ACD predicited pK$_a$ for thiocyanic acid: ~0.93; pK$_a$ reported as 4.0 in the Bordwell online pK$_a$ database, http://www.chem.wisc.edu/areas/reich/pkatable/index.htm

What is claimed is:

1. A cyclic process for separating $CO_2$ from a gas stream which process comprises:
   a) contacting the gas stream at a first temperature with a non-aqueous $CO_2$ sorbent comprising an ionic liquid containing a potentially nucleophilic carbon atom bearing an acidic hydrogen atom bonded to a potentially nucleophilic carbon atom to sorb $CO_2$ into the sorbent; and
   b) treating the sorbent containing the sorbed $CO_2$ under conditions including a second temperature, to cause desorption of at least a portion of the $CO_2$ and to regenerate the ionic liquid.

2. The process of claim 1, wherein the acidic hydrogen atom of the ionic liquid cation is bonded to a potentially nucleophilic carbon atom in a conjugated —NC(H)N— structure or a —NC(H)S— structure.

3. The process of claim 1 wherein the ionic liquid solvent comprises an imidazolium, imidazolidinium, benzimidazolium or thiazolium salt.

4. The process of claim 3, wherein the imidazolium, imidazolidinium, benzimidazolium or thiazolium salt is a salt having a counterion derived from an organic acid with a pKa of at least 4.0 (25° C. aqueous equivalent scale).

5. The process of claim 4, wherein the imidazolium, imidazolidinium, benzimidazolium or thiazolium salt is an acetate or other carboxylate salt.

6. The process of claim 1, wherein the gas stream is contacted with a non-aqueous $CO_2$ sorbent comprising (i) an ionic liquid containing a potentially nucleophilic carbon atom bearing an acidic hydrogen atom bonded to a potentially nucleophilic carbon atom and (ii) a non-nucleophilic nitrogenous base having a pK$_a$ of at least 10.0 (25° C. aqueous equivalent scale).

7. The process of claim 6, wherein the non-nucleophilic nitrogenous base has a pK$_a$ of at least 12.

8. The process of claim 6, wherein the non-nucleophilic nitrogenous base is a carboxamidine or guanidine.

9. The process of claim 1, wherein the first temperature is from 25° C. to 50° C. and the second temperature is not greater than 100° C.

10. The process of claim 1, wherein the second temperature is higher than the first temperature.

11. The process of claim 10, wherein the first temperature is from 70 to 100° C. and the second temperature is greater than 100° C.

12. The process of claim 1, wherein the second temperature is not more than 30° C. higher than the first temperature.

13. The process of claim 1 in which the non-aqueous $CO_2$ sorbent comprises an ionic liquid containing a potentially nucleophilic carbon atom bearing an acidic hydrogen atom bonded to a potentially nucleophilic carbon atom and an aprotic, non-aqueous solvent.

14. The process of claim 13 in which the aprotic, non-aqueous solvent is a polar solvent.

15. The process of claim 13 in which the aprotic, non-aqueous solvent comprises toluene, dimethylsulfoxide, dimethylformamide, sulfolane, N-methyl-2-pyrrolidone, propylene carbonate, a dimethyl ether of ethylene and propylene glycol or tetrahydrofuran.

16. The process of claim 1 in which the $CO_2$ is sorbed by means of a C-carboxylation reaction between $CO_2$ and the ionic liquid.

17. The process of claim 16 in which the ionic liquid comprises an imidazolium salt and the $CO_2$ is sorbed by means of a C-carboxylation reaction between the $CO_2$ and the C-2 carbon of the imidazole ring.

18. A method of separating $CO_2$ from a mixed gas stream in a continuous cyclic sorption-desorption process which comprises:
   a) contacting the gas stream in a gas/liquid sorption zone with a circulating stream of a non-aqueous liquid sorbent medium comprising an ionic liquid containing a potentially nucleophilic carbon atom bearing an acidic hydrogen atom bonded to a potentially nucleophilic carbon atom under conditions to form a rich solution of $CO_2$ sorbed in the liquid sorbent medium;
   b) passing the rich solution of $CO_2$ sorbed in the liquid sorbent medium to a regeneration zone wherein $CO_2$ is desorbed from the rich solution in the liquid sorbent medium under conditions required for desorption of the $CO_2$ thereby producing a regenerated lean solution; and
   c) cycling the resulting regenerated lean solution with reduced $CO_2$ content to the sorption zone.

19. The process of claim 18, wherein the acidic hydrogen atom of the ionic liquid cation is bonded to a potentially nucleophilic carbon atom in a conjugated —NC(H)N— structure or a —NC(H)S— structure.

20. The process of claim 18, wherein the ionic liquid comprises an imidazolium, imidazolidinium or thiazolium salt.

21. The process of claim 20, wherein the salt is a imidazolium, imidazolidinium, benzimidazolium or thiazolium salt having a counterion derived from an organic acid with a $pK_a$ of at least 4.0 (25° C. aqueous equivalent scale).

22. The process of claim 21, wherein the imidazolium, imidazolidinium, benzimidazolium or thiazolium salt is an acetate or other carboxylate salt.

23. The process of claim 18, wherein the gas stream is contacted with the non-aqueous liquid sorbent medium at a first temperature and the rich solution containing the sorbed $CO_2$ is treated under conditions including a second temperature which is higher than the first temperature to cause desorption of at least a portion of the $CO_2$.

24. The process of claim 23, wherein the first temperature is from 70 to 100° C. and the second temperature is greater than 100° C.

25. The process of claim 23, wherein the second temperature is not more than 30° C. higher than the first temperature.

26. The process of claim 18 in which the non-aqueous $CO_2$ sorbent comprises an ionic liquid containing a potentially nucleophilic carbon atom bearing an acidic hydrogen atom bonded to a potentially nucleophilic carbon atom and an aprotic, non-aqueous solvent.

27. The process of claim 26 in which the aprotic, non-aqueous solvent is a polar solvent.

28. The process of claim 26 in which the aprotic, non-aqueous solvent comprises toluene, dimethylsulfoxide, dimethylformamide, sulfolane, N-methyl-2-pyrrolidone, propylene carbonate, a dimethyl ether of ethylene and propylene glycol or tetrahydrofuran.

29. The process of claim 18 in which the $CO_2$ is sorbed by means of a C-carboxylation reaction between $CO_2$ and the ionic liquid.

30. The process of claim 29 in which the ionic liquid comprises an imidazolium salt and the $CO_2$ is sorbed by means of a C-carboxylation reaction between the $CO_2$ and the C-2 carbon of the imidazole ring.

31. The process of claim 18 in which the non-aqueous liquid sorbent medium comprises the ionic liquid and a non-nucleophilic nitrogenous base having a pKa (25° C. aqueous equivalent scale) of at least 10.0.

32. The process of claim 31 in which the non-aqueous liquid sorbent medium comprises the ionic liquid and a non-nucleophilic nitrogenous base having a pKa (25° C. aqueous equivalent scale) of at least 12.0.

33. The process of claim 32 in which the non-nucleophilic nitrogenous base is an imine, heterocyclic imine or amine, an amidine or carboxamidine.

34. The process of claim 33 in which the non-nucleophilic nitrogenous base comprises a guanidine.

35. The process of claim 34 in which the non-nucleophilic nitrogenous base comprises a substituted guanidine of the formula $(R^1R^2N)(R^3R^4N)C=N-R^5$ where $R^1$, $R^2$, $R^3$, and $R^4$ are $C_1$-$C_6$ alkyl and $R^5$ is H.

36. The process of claim 34 in which the non-nucleophilic nitrogenous base comprises 1,1,3,3-tetramethylguanidine.

\* \* \* \* \*